United States Patent
Gwon et al.

(10) Patent No.: US 11,942,593 B2
(45) Date of Patent: Mar. 26, 2024

(54) LITHIUM BATTERY

(71) Applicant: Samsung Electronics Co., Ltd., Suwon-si (KR)

(72) Inventors: Hyeokjo Gwon, Hwaseong-si (KR); Jinkyu Kang, Hwaseong-si (KR); Kitae Park, Seoul (KR); Hyunchul Lee, Hwaseong-si (KR); Ryounghee Kim, Uiwang-si (KR); Euncheol Do, Seoul (KR); Soojin Park, Hwaseong-si (KR); Sangmin Ji, Yongin-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 356 days.

(21) Appl. No.: 17/545,036

(22) Filed: Dec. 8, 2021

(65) Prior Publication Data

US 2022/0102750 A1 Mar. 31, 2022

Related U.S. Application Data

(63) Continuation of application No. 16/517,302, filed on Jul. 19, 2019, now Pat. No. 11,245,130.

(30) Foreign Application Priority Data

Jul. 27, 2018 (KR) .................. 10-2018-0088152

(51) Int. Cl.
| | |
|---|---|
| *H01M 10/052* | (2010.01) |
| *H01M 10/0567* | (2010.01) |
| *H01M 50/403* | (2021.01) |
| *H01M 50/417* | (2021.01) |
| *H01M 50/429* | (2021.01) |
| *H01M 50/44* | (2021.01) |
| *H01M 50/449* | (2021.01) |
| *H01M 50/457* | (2021.01) |
| *H01M 50/46* | (2021.01) |
| *H01M 50/48* | (2021.01) |
| *H01M 50/489* | (2021.01) |
| *H01M 50/491* | (2021.01) |
| *H01M 50/494* | (2021.01) |

(52) U.S. Cl.
CPC ..... *H01M 10/052* (2013.01); *H01M 10/0567* (2013.01); *H01M 50/417* (2021.01); *H01M 50/429* (2021.01); *H01M 50/44* (2021.01); *H01M 50/449* (2021.01); *H01M 50/457* (2021.01); *H01M 50/46* (2021.01); *H01M 50/403* (2021.01); *H01M 50/489* (2021.01); *H01M 50/491* (2021.01); *H01M 50/494* (2021.01)

(58) Field of Classification Search
None
See application file for complete search history.

(56) References Cited

U.S. PATENT DOCUMENTS

| | | | |
|---|---|---|---|
| 8,431,273 B2 | 4/2013 | Saruwatari et al. | |
| 9,614,249 B2 | 4/2017 | Fujiwara et al. | |
| 2006/0035137 A1 | 2/2006 | Maruo et al. | |
| 2012/0121991 A1 | 5/2012 | Tikhonov et al. | |
| 2016/0190534 A1 | 6/2016 | Kimura et al. | |
| 2016/0268064 A1 | 9/2016 | Ishikawa et al. | |
| 2016/0351874 A1 | 12/2016 | Kang | H01M 50/44 |
| 2017/0214020 A1 | 7/2017 | Yamaguchi et al. | |
| 2017/0331093 A1 | 11/2017 | Kim et al. | |
| 2018/0013117 A1 | 1/2018 | Park | H01M 50/4295 |
| 2018/0034027 A1 | 2/2018 | Shang | H01M 50/411 |
| 2018/0175459 A1 | 6/2018 | McCalla | H01M 10/0567 |

FOREIGN PATENT DOCUMENTS

| | | |
|---|---|---|
| JP | 2013251236 A | 12/2013 |
| JP | 2014-082192 A | 5/2014 |
| JP | 5813736 B2 | 10/2015 |
| KR | 2005-0056994 A | 6/2005 |
| KR | 20160079634 A | 7/2016 |
| KR | 20160110131 A | 9/2016 |
| KR | 2017-0088291 A | 8/2017 |
| KR | 2018-0023627 A | 3/2018 |

OTHER PUBLICATIONS

KR Office Action dated Sep. 26, 2023 of KR Patent Application No. 10-2018-0088152.
Chen et al., "Mixed salts of LiTFSI and LiBOB for stable LiFePO$_4$-based batteries at elevated temperatures", *Journal of Materials Chemistry A*, 2: 2346-2352 (2014).
P. Xiao, T. Lv, X. Chen, C. Chang. LiNi0.8Co0.15Al0.05O2: Enhanced Electrochemical Performance From Reduced Cationic Disordering in Li Slab. Sci Rep. 2017;7(1):1408. Published May 3, 2017.
E. Mamycheva. Sources of Glass Transition Temperature Variation in Poly(methylmethacrylate)/Cellulose Composites, Thesis, Jun. 2018.

*Primary Examiner* — Carlos Barcena
(74) *Attorney, Agent, or Firm* — CANTOR COLBURN LLP

(57) ABSTRACT

Provided herein is a lithium battery including: a cathode including a cathode active material; an anode including an anode active material; an electrolyte between the cathode and the anode; and a separator impregnated with the electrolyte, wherein the separator includes carboxyl group-containing microbial cellulose nanofibers, and wherein a differential scanning calorimetry (DSC) thermogram of the separator evinces an exothermic reaction peak, represented by a differential value (dH/dT), at a temperature in a range of about 150° C. to about 200° C.

30 Claims, 8 Drawing Sheets

LITHIUM BATTERY

CROSS-REFERENCE TO RELATED APPLICATION

This application is a continuation of U.S. application Ser. No. 16/517,302, filed on Jul. 19, 2019, which claims the benefit of Korean Patent Application No. 10-2018-0088152, filed on Jul. 27, 2018, in the Korean Intellectual Property Office, the entire disclosure of both of which is hereby incorporated herein by reference.

BACKGROUND

1. Field

The present disclosure relates to lithium batteries.

2. Description of the Related Art

Electrochemical batteries such as lithium secondary batteries include a separator to separate a positive electrode from a negative electrode, thereby preventing a short circuit. Separators must be tolerant to an electrolyte solution and must exhibit low internal resistance. Recently, demand for heat-resistant electrochemical batteries for use in automobiles has increased. A porous film formed of a polyolefin-based material such as polyethylene or polypropylene is sometimes used as a separator in lithium secondary batteries. However, since batteries for automobiles require resistance to high temperatures, i.e., 150° C. or more, it is difficult to apply polyolefin-based separators to these batteries.

Cellulose-containing porous films have high heat resistance, and thus are suitable for use as separators of batteries for automobiles. Before being used, separators including cellulose are impregnated with electrolytes for lithium batteries. This can result in a side reaction between a cellulose-containing separator and an electrolyte, which deteriorates the performance of lithium batteries. Accordingly, there is a need for a lithium battery including a cellulose-containing separator in which such a side reaction is suppressed.

SUMMARY

Provided are lithium batteries in which a side reaction of a separator with an electrolyte is suppressed at high temperatures. According to an aspect of the disclosure, a lithium battery includes: a cathode including a cathode active material; an anode including an anode active material; an electrolyte between the cathode and the anode; and a separator impregnated with the electrolyte, wherein the separator includes cellulose nanofibers, and an exothermic reaction peak represented by a differential value (dH/dT) of a thermogram is free at a temperature in a range of about 150° C. to about 200° C. at the time of differential scanning calorimetry (DSC) measurement of the separator impregnated with the electrolyte.

Additional aspects will be set forth in part in the description which follows and, in part, will be apparent from the description, or may be learned by practice of the presented embodiments.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
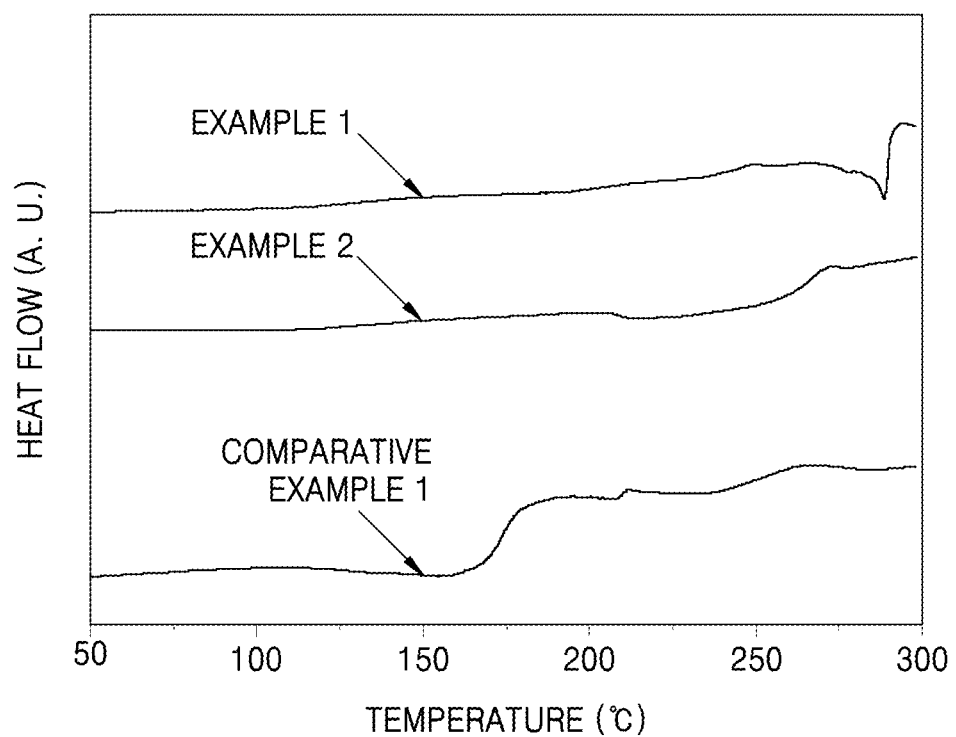
FIG. 1 is a differential scanning calorimetry (DSC) thermogram of separators prepared according to Examples 1 and 2 and Comparative Example 1.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

As the present disclosure allows for various changes and numerous embodiments, example embodiments will be illustrated in the drawings and described in the detailed description in detail. However, this is not intended to limit the present disclosure to particular modes of practice, and it is to be appreciated that all changes, equivalents, and substitutes that do not depart from the spirt and technical scope of the present disclosure are encompassed in the present disclosure.

The terminology used in the following description is used only to describe specific embodiments and is not intended to limit the present disclosure. An expression in the singular includes an expression in the plural unless the content clearly indicates otherwise. In the following description, it should be understood that terms, such as "include" and "have", are used to indicate the presence of stated features, numbers, steps, operations, elements, parts, components, materials, or a combination thereof described in the specification without excluding in advance the possibility of the presence or addition of one or more other features, numbers, steps, operations, elements, parts, components, materials, or combinations thereof.

In the drawings, thicknesses are enlarged or reduced to clearly represent various layers and regions. Throughout the specification, like reference numerals denote like elements. In the entire specification, when a portion of a layer, a film, a region, a plate, or the like is referred to as being "on" or "above" another portion, it includes not only a case in which the portion is directly on the other portion, but also a case in which an intervening portion is present therebetween.

Throughout the specification, although terms such as "first," "second," and the like may be used to described various components, such components must not be limited by the above terms. The above terms are used only to distinguish one component from another.

Hereinafter, lithium batteries according to example embodiments will be described in more detail.

A lithium battery according to an embodiment includes: a cathode including a cathode active material; an anode including an anode active material; an electrolyte disposed between the cathode and the anode; and a separator impregnated with the electrolyte, wherein the separator includes cellulose nanofibers. Impregnated, as used herein consistent with its plain meaning and ordinary usage, means that the separator comprises the electrolyte within the material of the separator, i.e., between the fibers. In other words, the separator is partially or completely saturated with the electrolyte, as would occur form soaking the separator in the electrolyte. Thus, for instance, the separator may be disposed in the electrolyte contained in the battery. Furthermore, the separator is such that a differential scanning calorimetry (DSC) measurement of the separator impregnated with the electrolyte is free of (i.e., does not show) an exothermic reaction peak represented by a differential value (dH/dT) of a thermogram at a temperature ranging from about 150° C. to about 200° C.

When an exothermic reaction peak represented by a differential value (dH/dT) of a thermogram is free at a temperature ranging from about 150° C. to about 200° C. at the time of differential scanning calorimetry (DSC) measurement of the separator impregnated with the electrolyte, a side reaction of the separator and the electrolyte is suppressed, and thus deterioration due to the side reaction of the separator and the electrolyte is suppressed in the lithium battery including the separator and the electrolyte. Referring to the thermogram of Comparative Example 1 of FIG. 1, there is a region where the slope of the line increases and then decreases within the temperature range of about 150° C. to about 200° C. This increase and decrease in slope is a peak when represented by differential values. In contrast, referring to the thermograms of Examples 1 and 2 also presented in FIG. 1, the slope of the line is substantially over the same temperature range of about 150° C. to about 200° C. Thus, no peak is shown when represented by a differential value. For example, the "exothermic reaction peak" is a peak represented by a differential value at a certain region of DSC thermogram, wherein the certain region of DSC thermogram sequentially has a first low slope region (region A), a high slope region (region B), and a second low slope region (region C), and an angel between a first tangent line at the first low slope region (region A) and a second tangent line at the high slope region (region B) is at least 30°.

In a lithium battery according to certain embodiments, after the separator impregnated with the electrolyte is exposed to heat at 170° C. for 3 hours under an inert atmosphere, the crystalline index of the separator after the heat exposure is 50% or more, 55% or more, 60% or more, 65% or more, 70% or more, 75% or more, 80% or more, 85% or more, 90% or more, or 95% or more the crystalline index of the separator before the heat exposure. For example, when the crystalline index of the separator before the heat exposure is 60, the crystalline index of the separator after the heat exposure is 30 or more. The crystalline index of the separator, as measured by an X-ray diffraction (XRD) spectrum, is expressed in terms of an intensity ratio $((I_{002}-I_{AM})/I_{002})$ of a crystalline peak intensity $(I_{002}-I_{AM})$ to a total peak intensity $I_{002}$ of a (002) crystal plane, wherein the crystalline peak intensity is a difference between the total peak intensity $I_{002}$ of the (002) crystal plane and a peak intensity $I_{AM}$ of an amorphous phase. Even when the separator impregnated with the electrolyte is exposed to heat for a long period of time, the side reaction of the electrolyte and the separator is suppressed, and thus the deterioration of crystalinity of the separator is suppressed. For example, the separator impregnated with the electrolyte is prepared by completely submerging the separator in the electrolyte for 30 minutes at room temperature.

In the lithium battery according to certain embodiments, after the separator impregnated with the electrolyte is exposed to heat at 170° C. for 3 hours under an inert atmosphere, carbonized areas are not substantially present on the surface of the separator. For example, no carbonized area (e.g., black or brown discoloration) is visible with the naked eye on the separator surface.

In the lithium battery, for example, the electrolyte includes at least one selected from an ionic metal complex represented by Formula 1 and a lithium salt containing a sulfonyl group ($-S(=O)_2-$):

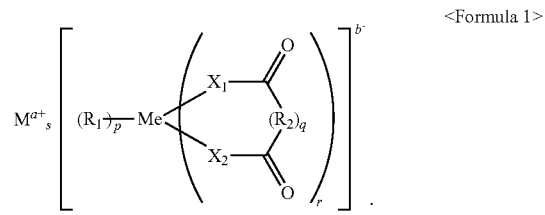
<Formula 1>

In Formula 1, Me is an element selected from transition metals and elements belonging to groups 13 to 15 of Periodic Table; M is a metal ion; a is an integer of 1 to 3, b is an integer of 1 to 3, and s=b/a; p is 0 to 8, q is 0 or 1, and r is 1 to 4; $X_1$ and $X_2$ are independently O, S, or $NR_a$; $R_1$ and $R_a$ are independently halogen, a $C_1$-$C_5$ alkyl group unsubstituted or substituted with one or more halogens, or a $C_1$-$C_5$ aryl group unsubstituted or substituted with one or more halogens; and $R_2$ is a $C_1$-$C_5$ alkylene group unsubstituted or substituted with a halogen, or a $C_1$-$C_5$ arylene group unsubstituted or substituted with one or more halogens.

For example, in the lithium battery, the ionic metal complex can be represented by Formula 2:

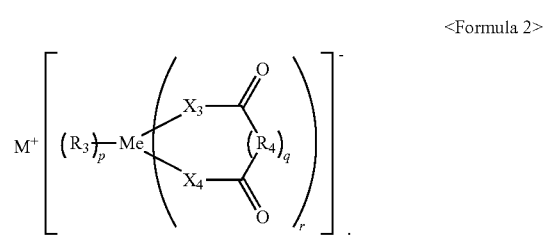
<Formula 2>

In Formula 2, Me is Al, B, or P; M is a metal ion; p is 0 to 8, q is 0 or 1, and r is 1 to 4; $X_3$ and $X_4$ are independently O or S; $R_3$ is a halogen; and $R_4$ is a $C_1$-$C_5$ alkylene group unsubstituted or substituted with one or more halogens, or a $C_1$-$C_5$ arylene group unsubstituted or substituted with one or more halogens.

For example, in the lithium battery, the ionic metal complex can be represented by Formulae 3 or 4:

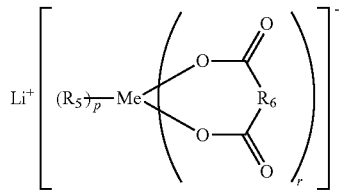
<Formula 3>

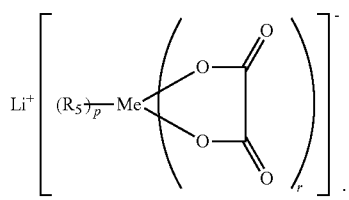
<Formula 4>

In Formulae 3 and 4, Me is Al, B, or P; p is 0 to 8, and r is 1 to 4; $R_5$ is halogen; and $R_6$ is a $C_1$-$C_5$ alkylene group unsubstituted or substituted with one or more halogens.

For example, in the lithium battery, the ionic metal complex can be represented by one of Formulae 5 to 10.

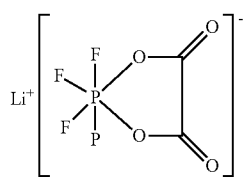
<Formula 5>

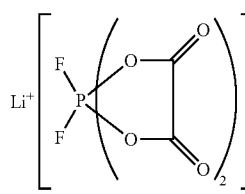
<Formula 6>

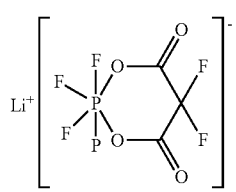
<Formula 7>

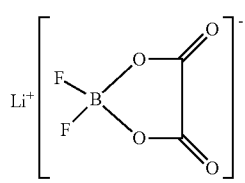
<Formula 8>

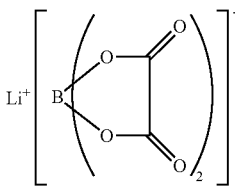
<Formula 9>

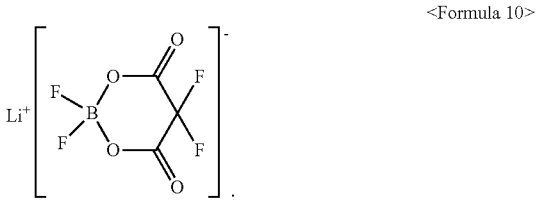
<Formula 10>

In the lithium battery, for example, the lithium salt containing the sulfonyl group is selected from $LiCF_3SO_3$, $LiC_4F_9SO_3$, $Li(CF_3SO_2)_2N$, $Li(C_2F_5SO_2)_2N$, $Li(FSO_2)_2N$, $Li(CF_3SO_3)_2N$, and $LiN(C_xF_{2x+1}SO_2)(C_yF_{2y+1}SO_2)$, wherein x and y are each independently an integer of 3 to 10.

In the lithium battery, the content of at least one selected from the ionic metal complex and the lithium salt containing the sulfonyl group included in the electrolyte is about 0.01M to about 5M, about 0.1M to about 4M, about 0.5M to about 3M, or about 1M to about 2M based on the total weight of the electrolyte. When the content of the ionic metal complex and the lithium salt containing the sulfonyl group is within the above range, the side reaction of the electrolyte and the separator is further suppressed.

In some embodiments of the lithium battery, the electrolyte may not include (may be free of) a sulfonyl group-free lithium salt, such as $LiPF_6$ or $LiBF_4$.

According to certain embodiments, the electrolyte is, for example, an organic electrolyte including an organic solvent. The organic electrolyte may be prepared by adding the ionic metal complex and the lithium salt containing the sulfonyl group to an organic solvent. Examples of the organic solvent included in the organic electrolyte include, but are not limited to, propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene, diethylene glycol, and dimethyl ether. Any organic solvent known in the art may be used. The electrolyte may not include an ionic liquid.

Alternatively, according to certain embodiments, the electrolyte is a solid electrolyte. Examples of the solid electrolyte include, but are not limited to, boron oxide and lithium oxynitride. Any solid electrolyte known in the art may be used. The solid electrolyte is formed on an anode or a cathode by sputtering, atomic layer deposition (ALD), chemical vapor deposition (CVD), physical vapor deposition (PVD), or the like. Alternatively, the electrolyte is a gel electrolyte.

The cellulose nanofibers included in the separator comprise, for example, natural cellulose such as plant cellulose nanofibers, animal cellulose nanofibers, or microbial cellulose nanofibers. Non-limiting examples of the cellulose nanofibers include coniferous wood pulp, deciduous wood pulp, cotton-based pulp such as cotton linter, non-wood-based pulp such as wheat straw pulp and bagasse pulp, cellulose separated from bacterial cellulose or Ascidiacea, and cellulose separated from seaweed. The cellulose nanofibers are, for example, microbial cellulose nanofibers.

The cellulose nanofibers included in the separator are, for example, carboxyl group-containing cellulose nanofibers. For example, the carboxyl group of the cellulose nanofibers of the separator is a carboxyl group bound to carbon atoms forming a pyranose ring, and the carboxyl group is represented by Formula a or b below:

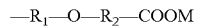  <Formula a>

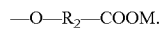  <Formula b>

In Formulae a and b, $R_1$ and $R_2$ are each independently a substituted or unsubstituted alkylene group of 1 to 10 carbon atoms, and M is hydrogen or an alkali metal. For example, the alkali metal is lithium, sodium, potassium, or the like. For example, $R_1$ and $R_2$ are each independently a methylene group. For example, the carboxyl group bound to carbon atoms forming a pyranose ring, included in the carboxyl group-containing cellulose nanofibers, is —$CH_2OCH_2COONa$ or —$OCH_2COONa$. The pyranose ring is, for example, glucopyranose. Thus, the carboxyl group of Formula a or b included in the carboxyl group-containing cellulose nanofibers has a specific structure different from that of a carboxyl group having the formula of —COOM which is bound to carbon atoms forming a pyranose ring in conventional oxidized cellulose nanofibers obtained through chemical oxidation.

The content of the carboxyl group of the carboxyl group-containing cellulose nanofibers used as the cellulose nanofibers included in the separator is, for example, 0.02 mmol/g or more, 0.06 mmol/g or more, 0.10 mmol/g or more, 0.15 mmol/g or more, or 0.20 mmol/g or more. The content of the carboxyl group of the carboxyl group-containing cellulose nanofibers included in the separator is, for example, about 0.02 mmol/g to about 10 mmol/g, about 0.02 mmol/g to about 5 mmol/g, about 0.02 mmol/g to about 3 mmol/g, about 0.02 mmol/g to about 2 mmol/g, or about 0.02 mmol/g to about 1 mmol/g. Since the cellulose nanofibers include the carboxyl group-containing cellulose nanofibers having a carboxyl group content within the above ranges, the separator including the same provides further enhanced tensile strength and tensile modulus. For a method of measuring the content of the carboxyl group of the cellulose nanofibers, refer to Evaluation Example 6.

As used herein, the "average diameter" of cellulose nanofibers is a value obtained by capturing transmission electron microscope (TEM) images of a plurality of fibers, obtaining the diameters of 100 fibers using an image analyzer for the TEM images, and then averaging these diameters.

The carboxyl group-containing cellulose nanofibers included in the separator may have an average diameter of, for example, 100 nm or less, 80 nm or less, 60 nm or less, 50 nm or less, 45 nm or less, 40 nm or less, 35 nm or less, 30 nm or less, or 25 nm or less. The average diameter of the cellulose nanofibers included in the separator is, for example, about 1 nm to about 300 nm, about 1 nm to about 200 nm, about 1 nm to about 100 nm, about 1 nm to about 50 nm, about 1 nm to about 45 nm, about 1 nm to about 40 nm, about 1 nm to about 35 nm, or about 1 nm to about 25 nm. Since the separator includes the carboxyl group-containing cellulose nanofibers having an average diameter within the above ranges, the tensile strength of the separator is further enhanced. For a method of measuring the average diameter of the carboxyl group-containing cellulose nanofibers, refer to Evaluation Example 7.

In a diameter distribution curve of the carboxyl group-containing cellulose nanofibers included in the separator, a full width at half maximum (FWHM) of a diameter peak may be, for example, 100 nm or less, 50 nm or less, 45 nm or less, 40 nm or less, 35 nm or less, 30 nm or less, 25 nm or less, 20 nm or less, 15 nm or less, or 10 nm or less. In the diameter distribution curve of the carboxyl group-containing cellulose nanofibers, the FWHM of the diameter peak may be, for example, about 1 nm to about 95 nm, about 1 nm to about 45 nm, about 5 nm to about 45 nm, or about 10 nm to about 45 nm. The separator including the carboxyl group-containing cellulose nanofibers having a FWHM within the above narrow ranges exhibits further enhanced uniformity, and further enhanced tensile strength due to increased contacts between fibers.

The carboxyl group-containing cellulose nanofibers may be, for example, carboxyl group-containing microbial or bacterial cellulose nanofibers. That is, the carboxyl group-containing microbial or bacterial cellulose nanofibers are, for example, a fermentation product of a culture solution including a microorganism and directly obtained from a culture solution including a microorganism. Thus, the carboxyl group-containing microbial or bacterial cellulose nanofibers included in the separator are distinguished from a simple mixture of existing general microbial or bacterial cellulose nanofibers and a carboxyl group-containing compound. In addition, the carboxyl group-including microbial or bacterial cellulose nanofibers are also distinguished from wood-based cellulose nanofibers obtained by decomposing a wood-based material. The carboxyl group-containing microbial or bacterial cellulose nanofibers used as the second cellulose nanofibers have an absorption peak corresponding to a carboxyl group at around 1,572 $cm^{-1}$ in an infrared (IR) spectrum. Carboxyl group-free microbial or bacterial cellulose does not have such an absorption peak.

The carboxyl group-containing microbial or bacterial cellulose nanofibers are obtained using, for example, a microorganism derived from the genus *Enterobacter*, the genus *Gluconacetobacter*, the genus *Komagataeibacter*, the genus *Acetobacter*, the genus *Achromobacter*, the genus *Agrobacterium*, the genus *Alcaligenes*, the genus *Azotobacter*, the genus *Pseudomonas*, the genus *Rhizobium*, the genus *Sarcina*, the genus *Klebsiella*, or the genus *Escherichia*, but the present disclosure is not necessarily limited to the above examples, and the carboxyl group-containing microbial or bacterial cellulose nanofibers may be any microorganism that produces microbial or bacterial cellulose in the art. The microorganism derived from the genus *Acetobacter* may be, for example, *Actetobacter pasteurianus*. The microorganism derived from the genus *Agrobacterium* may be, for example, *Agrobacterium tumefaciens*. The microorganism derived from the genus *Rhizobium* may be, for example, *Rhizobium leguminosarum*. The microorganism derived from the genus *Sarcina* may be, for example, *Sarcina ventriculi*. The microorganism derived from the genus *Gluconacetobacter* may be, for example, *Gluconacetobacter xylinum*. The microorganism derived from the genus *Klebsiella* may be, for example, *Klebsiella pneumoniae*. The microorganism derived from the genus *Escherichia* may be, for example, *E. coli*.

In certain embodiments, the separator further includes, as the cellulose nanofibers, a combination of different types of cellulose nanofibers in addition to the microbial or bacterial cellulose nanofibers. For example, the separator further includes wood-based cellulose nanofibers, but the present disclosure is not necessarily limited thereto. Any suitable cellulose nanofibers known in the art that are capable of enhancing the tensile strength of a separator may be used.

The thickness of the separator is, for example, 10 μm or more. The thickness of the separator is, for example, 10 μm to 500 μm, 10 μm to 450 μm, 10 μm to 400 μm, 10 μm to 350 μm, 10 μm to 300 μm, 10 μm to 250 μm, 10 μm to 200 μm, 10 μm to 150 μm, 10 μm to 100 μm, 10 μm to 80 μm, 10 μm to 60 μm, 10 μm to 40 μm, or 10 μm to 30 μm. The thickness of the separator is, for example, 10 μm to 30 μm. When the thickness of the separator is too thin, the mechanical properties of the separator deteriorates, and such a separator may be damaged at the time of assembling a lithium battery employing the separator, or may be damaged by lithium dendrite generated during charging/discharging of the lithium battery, and thus the lithium battery deteriorates. When the separator is too thick, the internal resistance of the lithium battery employing the separator increases and impairs the cycle characteristics of the lithium battery. Use of a separator that is excessively thick results in an increase in volume of the lithium battery, thus lowering the energy density of the lithium battery per unit volume. Therefore, as the thickness of the separator decreases, the thickness of the lithium battery including the separator decreases, so that the energy density of the lithium battery per unit volume increases.

The air permeability of the separator according to certain embodiments may be expressed as a Gurley value, of, for example, about 50 sec/100 cc to about 800 sec/100 cc, about 100 sec/100 cc to about 750 sec/100 cc, about 150 sec/100 cc to about 700 sec/100 cc, about 200 sec/100 cc to about 650 sec/100 cc, about 250 sec/100 cc to about 600 sec/100 cc, about 300 sec/100 cc to about 600 sec/100 cc, about 350 sec/100 cc to about 600 sec/100 cc, about 350 sec/100 cc to about 550 sec/100 cc, or about 350 sec/100 cc to about 500 sec/100 cc. The Gurley value is measured using a method in accordance with Japanese Industrial Standards (JIS) P8117. When the Gurley value is too low, lithium is easily deposited in pores of the separator. Thus, when a separator having a very low Gurley value is used for a lithium battery, lithium blocking characteristics deteriorate, and thus a short circuit due to lithium dendrites easily occurs. When the Gurley value of the porous film is too high, the transfer of lithium ions through the separator is inhibited. Thus, when a separator having a very high Gurley value is used for a lithium battery, internal resistance of the lithium battery is increased, resulting in deteriorated cycle characteristics of the lithium battery. In addition, the separator has a uniform Gurley value over its entire area. Since the separator has uniform air permeability, current density is uniformly distributed in an electrolyte of a lithium battery including the porous film as a separator, and thus a side reaction, such as deposition of crystals at an interface between an electrode and an electrolyte, is suppressed.

The separator according to certain embodiments may have a porosity of, for example, about 10% to about 90%, about 15% to about 85%, about 20% to about 80%, about 25% to about 80%, about 30% to about 80%, about 35% to about 80%, about 35% to about 75%, or about 40% to about 75%. Even when the porosity of the separator is less than 10%, a lithium battery may still operate, but internal resistance thereof is increased, and thus output is reduced, resulting in deteriorated performance of the lithium battery. When the porosity of the separator is greater than 90%, internal resistance is excessively reduced, which may result in enhanced output characteristics of a lithium battery, for example, cycle characteristics of a lithium battery, but increases the likelihood of a short circuit due to lithium dendrites, resulting in reduced stability. The porosity of the separator is measured using a liquid or gas adsorption method in accordance with ASTM D-2873 (Standard Test Method for Interior Porosity of Poly(Vinyl Chloride) (PBC) Resins by Mercury Intrusion Porosimetry).

The separator may have a tensile strength of, for example, 200 kgf/cm$^2$ or more, 250 kgf/cm$^2$ or more, 300 kgf/cm$^2$ or more, 350 kgf/cm$^2$ or more, 360 kgf/cm$^2$ or more, 380 kgf/cm$^2$ or more, 400 kgf/cm$^2$ or more, 420 kgf/cm$^2$ or more, 440 kgf/cm$^2$ or more, 460 kgf/cm$^2$ or more, 460 kgf/cm$^2$ or more, 480 kgf/cm$^2$ or more, 500 kgf/cm$^2$ or more, 550 kgf/cm$^2$ or more, 600 kgf/cm$^2$ or more, 650 kgf/cm$^2$ or more, 700 kgf/cm$^2$ or more, 750 kgf/cm$^2$ or more, 800 kgf/cm$^2$ or more, 850 kgf/cm$^2$ or more, 900 kgf/cm$^2$ or more, or 950 kgf/cm$^2$ or more. The tensile strength of the separator may be, for example, about 200 kgf/cm$^2$ to about 1,000 kgf/cm$^2$, about 300 kgf/cm$^2$ to about 1000 kgf/cm$^2$, about 50 kgf/cm$^2$ to about 800 kgf/cm$^2$, about 50 kgf/cm$^2$ to about 700 kgf/cm$^2$, about 400 kgf/cm$^2$ to about 1000 kgf/cm$^2$, about 500 kgf/cm$^2$ to about 1000 kgf/cm$^2$, about 500 kgf/cm$^2$ to about 950 kgf/cm$^2$, about 500 kgf/cm$^2$ to about 900 kgf/cm$^2$, about 500 kgf/cm$^2$ to about 850 kgf/cm$^2$, about 500 kgf/cm$^2$ to about 800 kgf/cm$^2$, about 500 kgf/cm$^2$ to about 750 kgf/cm$^2$, or about 500 kgf/cm$^2$ to about 700 kgf/cm$^2$. When the tensile strength of the separator is within the above range, it is possible to achieve a minimum tensile strength required for the manufacture of a winding-type battery, and pin-puncture strength is further enhanced. Thus, when such a separator is employed, the durability of the separator increases during charging and discharging of a lithium battery, and the thickness of the separator is reduced, and, accordingly, battery capacity is further increased. When the tensile strength of the separator is less than 200 kgf/cm$^2$, the durability of the separator decreases, which leads to breakage of the separator when a battery is manufactured, resulting in reduced manufacturing yield, and it is impossible to manufacture a winding-type battery. In addition, when the tensile strength of the porous film is less than 50 kgf/cm$^2$, pin-puncture strength is low and thus durability is low, and the thickness of the separator, required to secure minimum tension, is increased, resulting in deteriorated battery capacity. The tensile strength of the separator is measured in accordance with Japanese Industrial Standards (JIS) K 7127.

The separator according to certain embodiments may have a pin-puncture strength (in terms of kilogram-force kgf) of, for example, 30 kgf or more, 50 kgf or more, 70 kgf or more, 75 kgf or more, 80 kgf or more, 85 kgf or more, 90 kgf or more, 95 kgf or more, or 100 kgf or more. The pin-puncture strength of the separator may be, for example, about 30 kgf to about 150 kgf, about 50 kgf to about 150 kgf, about 70 kgf to about 150 kgf, about 75 kgf to about 150 kgf, about 80 kgf to about 150 kgf, about 80 kgf to about 145 kgf, about 85 kgf to about 140 kgf, about 90 kgf to about 140 kgf, or about 90 kgf to about 130 kgf. When the pin-puncture strength of the separator is within the above range, it is possible to effectively suppress a short circuit due to dendrite during charging and discharging. Thus, when such a separator is employed, the durability of the separator increases during charging and discharging of a lithium battery, deterioration of the battery is suppressed, the thickness of the separator is reduced, and the the battery capacity further increases. When the penetration strength of the separator is less than 30 kgf, the durability of the separator decreases, and thus the thickness of the separator, required to secure minimum pin-puncture strength, is increased, resulting in deteriorated battery capacity. The method of measuring the pin-puncture strength of the separator is not particularly limited, and any method known in the art may be used.

In at least one embodiment, in addition to the cellulose nanofibers, the separator further includes at least one selected from a cross-linking agent, a binder, inorganic particles, and polyolefin. These components may be included or excluded in order to adjust physical properties of the separator. If the separator further includes a cross-linking agent and/or a binder, the tensile strength of the separator can be further enhanced.

The cross-linking agent aids in binding of cellulose nanofibers. The cross-linking agent may be added in an amount of about 1 part by weight to about 50 parts by weight with respect to 100 parts by weight of cellulose nanofibers, but the amount of the cross-linking agent is not necessarily limited to the above range, and may be within any range that may enhance physical properties of the separator. The amount of the cross-linking agent ranges from, for example, about 1 part by weight to about 30 parts by weight, about 1 part by weight to about 20 parts by weight, or about 1 part by weight to about 15 parts by weight, with respect to 100 parts by weight of cellulose nanofibers. The cross-linking agent may be, for example, at least one selected from isocyanate, polyvinyl alcohol, and polyamide epichlorohydrin (PAE), but is not necessarily limited to the above examples, and may be any cross-linking agent that may be used in the art.

The binder aids in binding of cellulose nanofibers. The binder may be added in an amount of about 1 part by weight to about 50 parts by weight with respect to 100 parts by weight of cellulose nanofibers, but the amount of the binder is not necessarily limited to the above range, and may be within any range that may enhance physical properties of the separator. The amount of the binder ranges from, for example, about 1 part by weight to about 30 parts by weight, about 1 part by weight to about 20 parts by weight, or about 1 part by weight to about 15 parts by weight, with respect to 100 parts by weight of cellulose nanofibers. The binder may be, for example, at least one selected from cellulose single nanofiber, methyl cellulose, hydroxypropyl methylcellulose, hydroxyethyl methyl cellulose, carboxyl methyl cellulose, ethyl cellulose, polyvinylidene fluoride-co-hexafluoropropylene, polyvinylidene fluoride-co-trichloroethylene, polymethylmethacrylate, polyacrylonitrile, polyvinylpyrrolidone, polyvinylacetate, polyethylene-co-vinyl acetate, polyimide, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, and polyvinylalcohol, but the present disclosure is not necessarily limited to the above examples, and the binder may be any binder used in the art.

The inorganic particles enhance mechanical properties of the separator. The inorganic particles may be added in an amount of about 0.01 parts by weight to about 20 parts by weight with respect to 100 parts by weight of cellulose nanofibers, but the amount of the inorganic particles is not necessarily limited to the above range, and may be within any range that may enhance physical properties of the separator. The amount of the binder ranges from, for example, about 1 part by weight to about 30 parts by weight, about 1 part by weight to about 20 parts by weight, or about 1 part by weight to about 15 parts by weight, with respect to 100 parts by weight of cellulose nanofibers. Examples of the inorganic particles include: a metal oxide selected from alumina ($Al_2O_3$), silica ($SiO_2$), titania ($TiO_2$), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $BaTiO_3$, $Li_2O$, $RaO$, $CaO$, $SrO$, $Sc_2O_3$, $Ce_2O_3$, and cage-type silsesquioxane; a metal nitride selected from ZrN, TaN, HfN, VN, NbN, $Cr_2N$, TaN, CrN, GeN, $TLi_3N$, $Mg_3N_2$, $Ca_3N_2$, $Sr_3N_2$, $Ba_3N_2$, BN, AlN, and TiN; a metal oxynitride selected from tantalum oxynitride (TaON), zirconium oxynitride ($ZrO_xN_y$ where $0<x<2, 0<y<3$), and lithium phosphorus oxynitride (LiPON); a metal carbide selected from TiC, ZrC, HfC, NbC, TaC, $Cr_3C_2$, $Mo_2C$, WC, and SiC; a metal-organic framework (MOF); a lithiated compound of each of the above-listed compounds; one or more ceramic conductors selected from $Li_{1+x+y}Al_xTi_{2-x}Si_yP_{3-y}O_{12}$ where $0<x<2$ and $0\leq y<3$, $BaTiO_3$, $Pb(Zr,Ti)O_3$ (PZT), $Pb_{1-x}La_xZr_{1-y}Ti_yO_3$ (PLZT) where $0\leq x<1$ and $0y<1$, $Pb(Mg_3Nb_{2/3})O_3$—$PbTiO_3$ (PMN-PT), lithium phosphate ($Li_3PO_4$), lithium titanium phosphate ($Li_xTi_y(PO_4)_3$ where $0<x<2$ and $0<y<3$, lithium aluminum titanium phosphate ($Li_xAl_yTi_z(PO_4)_3$ where $0<x<2$, $0<y<1$, and $0<z<3$, $Li_{1+x+y}(Al, Ga)_x(Ti, Ge)_{2-x}Si_yP_{3-y}O_{12}$ where $0\leq x\leq 1$ and $0\leq y\leq 1$, lithium lanthanum titanate ($Li_xLa_yTiO_3$ where $0<x<2$ and $0<y<3$), lithium germanium thiophosphate ($Li_xGe_yP_zS_w$ where $0<x<4$, $0<y<1$, $0<z<1$, and $0<w<5$), lithium nitride ($Li_xN_y$ where $0<x<4$ and $0<y<2$), $SiS_2(Li_xSi_yS_z$ where $0<x<3, 0<y<2$, and $0<z<4$)-based glass, $P_2S_5(Li_xP_yS_z$ where $0<x<3$, $0<y<3$, and $0<z<7$)-based glass, $Li_2O$—$Al_2O_3$—$SiO_2$—$P_2O_5$—$TiO_2$—$GeO_2$-based ceramic, and Garnet-based ceramic $Li_{3+x}La_3M_2O_{12}$ where $0\leq x\leq 5$, wherein M=Te, Nb, or Zr; and a carbonaceous nanostructure such as graphene, carbon nanotubes (CNTs), and carbon nanofibers (CNFs), but the present disclosure is not limited to the above examples, and the inorganic particles may be any inorganic particles used in the art. The inorganic particles may have a diameter of, for example, about 1 nm to about 10 μm, about 10 nm to about 6 μm, or about 100 nm to about 1 μm. The inorganic particles are disposed, for example, inside the separator and/or on one surface of the separator.

As used herein, the "size" indicates an average particle diameter when particles are spherical. The "size" indicates a major axis length when particles are rod-shaped or elliptical. As used herein, the "average particle size" or "average particle diameter" refers to a particle diameter (D50) corresponding to 50% of particle diameters in a distribution curve where particles with the smallest particle diameter and particles with the largest particle diameter are accumulated in order. Here, the total number of accumulated particles is 100%. The average particle size may be measured according to methods known to those skilled in the art. For example, the average particle size may be measured using a particle size analyzer, TEM images, or SEM images. As another method of measuring the average particle size, there is a method using a measuring device using dynamic light scattering. According to this method, the number of particles having a predetermined size range may be counted, from which the average particle size may be calculated.

Polyolefin, which is a material of a general separator or the separator of the present disclosure, enhances the flexibility of the separator. Examples of the polyolefin include polyethylene and polypropylene. The polyolefin is formed into a porous film that is either a single-layer film or a multi-layer film including at least two layers. For example, the polyolefin is formed into a two-layer film of polyethylene/polypropylene, a three-layer film of polyethylene/polypropylene/polyethylene, a three-layer film of polypropylene/polyethylene/polypropylene, or the like, but the present disclosure is not limited to the above examples, and the polyolefin may be any polyolefin that may be used in the art.

In some embodiments, the porous film has a low contact angle with respect to a polar solvent, such as water, and thus provides enhanced wettability with respect to an electrolyte in a polar solvent. A contact angle of one exemplary separator with respect to water at 20° C. may be, for example, 60° or less, 50° or less, 40° or less, 30° or less, or 20° or less. When the contact angle of the separator with respect to water at 20° C. is too high, it is difficult to impregnate the porous film with an electrolyte. When the separator is used as a separator of a lithium battery, the separator provides enhanced wettability with respect to an electrolyte, and thus an interface between the separator and an electrode is uniformly impregnated with the electrolyte. Thus, a uniform electrode reaction proceeds at the interface between the separator and an electrode, and, accordingly, the formation of lithium dendrites (for example, due to a local overcurrent, or the like), is prevented, resulting in enhanced lifespan characteristics of a lithium battery.

The porous film has excellent thermal stability at a high temperature (for example, temperatures of 150° C. or higher), thus improving the thermal resistance of an electrochemical cell including the porous film as a separator. In certain embodiments, the porous film may have a heat shrinkage rate, after being maintained at 150° C. for 30 minutes, of 5% or less, 4.5% or less, 4% or less, 3.5% or less, 3% or less, 2.5% or less, 2% or less, 1.5% or less, or 1% or less. In contrast, currently available olefin-based porous films rapidly contract at a high temperature, i.e., between 150° C. and 200° C., and thus operation of a battery including such a porous film is stopped.

An exemplary separator according to an embodiment may have a heat shrinkage rate, after being maintained at 150° C. for 30 minutes, of 5% or less, 4.5% or less, 4% or less, 3.5% or less, 3% or less, 2.5% or less, 2% or less, 1.5% or less, or 1% or less. Since the separator provides excellent thermal stability at a high temperature, i.e., at 150° C. or more, a lithium battery including the separator exhibits enhanced heat resistance. In contrast, currently available general olefin-based separators rapidly contract at a high temperature, i.e., between 150° C. and 200° C., and thus operation of a lithium battery is stopped.

The separator has various single-layered structures or multi-layered structures according to required performance. Separators according to example embodiments having a single-layered or multi-layered structure will be described with reference to FIGS. 3A to 3H.

Figure 3A:
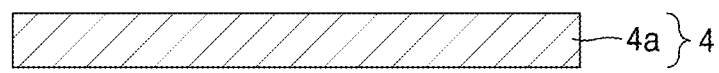
FIGS. 3A to 3H are schematic cross-sectional views of porous films according to example embodiments.

Referring to FIG. 3A, a separator 4 has a single-layered structure including a first layer 4a including cellulose nanofibers. The first layer 4a may include, for example, microbial cellulose nanofibers having an average particle diameter of 50 nm or less as the cellulose nanofibers.

Figure 3B:
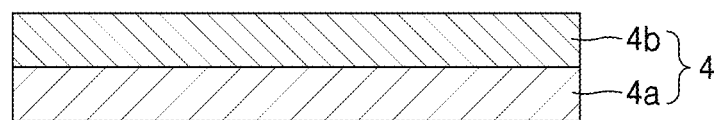

Referring to FIG. 3B, the separator 4 has a multi-layered structure including: a first layer 4a including cellulose nanofibers; and a second layer 4b disposed on one surface of the first layer 4a and including a polyolefin. The first layer 4a may include, for example, microbial cellulose nanofibers having an average particle diameter of 50 nm or less as the cellulose nanofibers. The second layer 4b may include, for example, at least one polyolefin selected from polyethylene and polypropylene.

Figure 3C:
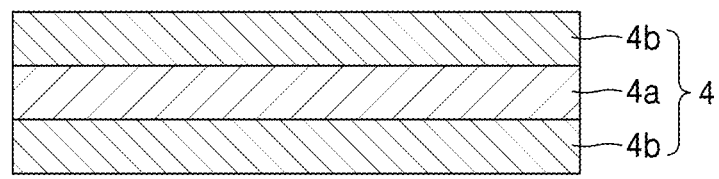

Referring to FIG. 3C, the separator 4 has a multi-layered structure including: a first layer 4a including cellulose nanofibers; a second layer 4b disposed on one surface of the first layer 4a and including a polyolefin; and a third layer 4b disposed on the other surface of the first layer 4a and including a polyolefin. The first layer 4a may include, for example, microbial cellulose nanofibers having an average particle diameter of 50 nm or less as the cellulose nanofibers. The second layer 4b and the third layer 4b may include, for example, at least one polyolefin selected from polyethylene and polypropylene. The second layer 4b and the third layer 4b, for example, may have the same composition.

Figure 3D:
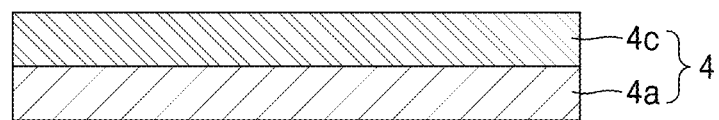

Referring to FIG. 3D, the separator 4 has a multi-layered structure including: a first layer 4a including cellulose nanofibers; and a second layer 4c disposed on one surface of the first layer 4a, including cellulose nanofibers, and having a composition different from that of the first layer 4a. The first layer 4a may include, for example, microbial cellulose nanofibers having an average particle diameter of 50 nm or less as the cellulose nanofibers. The second layer 4c may include, for example, microbial cellulose nanofibers having an average particle diameter of 50 nm or less and wood-based cellulose nanofibers having an average particle diameter of 100 nm or more as the cellulose nanofibers.

Figure 3E:
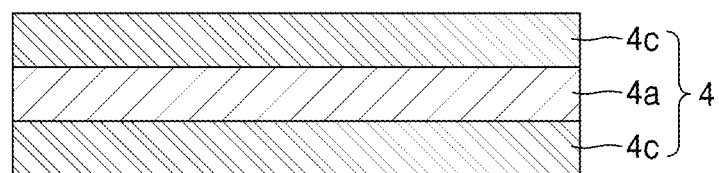

Referring to FIG. 3E, the separator 4 has a multi-layered structure including: a first layer 4a including cellulose nanofibers; a second layer 4c disposed on one surface of the first layer 4a, including cellulose nanofibers, and having a composition different from that of the first layer 4a; and a third layer 4c disposed on the other surface of the first layer 4a, including cellulose nanofibers, and having a composition different from that of the first layer 4a. The first layer 4a may include, for example, microbial cellulose nanofibers having an average particle diameter of 50 nm or less as the cellulose nanofibers. The second layer 4c and the third layer 4c may include, for example, microbial cellulose nanofibers having an average particle diameter of 50 nm or less and wood-based cellulose nanofibers having an average particle diameter of 100 nm or more as the cellulose nanofibers. The second layer 4c and the third layer 4c, for example, may have the same composition.

Figure 3F:
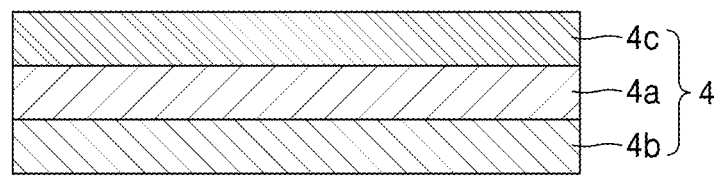

Referring to FIG. 3F, the separator 4 has a multi-layered structure including: a first layer 4a including cellulose nanofibers; a second layer 4b disposed on one surface of the first layer 4a and including a polyolefin; and a third layer 4c disposed on the other surface of the first layer 4a, including cellulose nanofibers, and having a composition different from that of the first layer 4a. The first layer 4a may include, for example, microbial cellulose nanofibers having an average particle diameter of 50 nm or less as the cellulose nanofibers. The second layer 4b may include, for example, at least one polyolefin selected from polyethylene and polypropylene. The third layer 4c may include, for example, microbial cellulose nanofibers having an average particle diameter of 50 nm or less and wood-based cellulose nanofibers having an average particle diameter of 100 nm or more as the cellulose nanofibers.

Figure 3G:
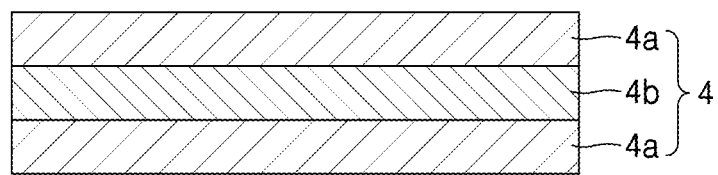

Referring to FIG. 3G, the separator 4 has a multi-layered structure including: a first layer 4b including a polyolefin; a second layer 4a disposed on one surface of the first layer 4b and including cellulose nanofibers; and a third layer 4a disposed on the other surface of the first layer 4b and including cellulose nanofibers. The second layer 4a and the third layer may include, for example, microbial cellulose nanofibers having an average particle diameter of 50 nm or less as the cellulose nanofibers. The second layer 4b may include, for example, at least one polyolefin selected from polyethylene and polypropylene. The second layer 4a and the third layer 4a, for example, may have the same composition.

Figure 3H:
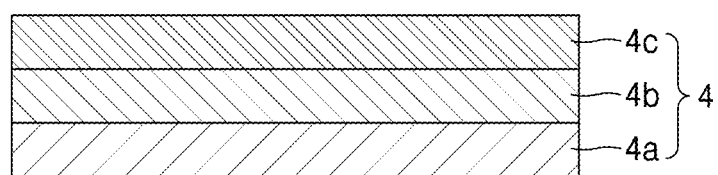

Referring to FIG. 3H, the separator 4 has a multi-layered structure including: a second layer 4b including a polyolefin; a first layer 4a disposed on one surface of the second layer 4b and including cellulose nanofibers; and a third layer 4c disposed on the other surface of the second layer 4b, including cellulose nanofibers, and having a composition different from that of the first layer 4a. The first layer 4a may include, for example, microbial cellulose nanofibers having an average particle diameter of 50 nm or less as the cellulose nanofibers. The second layer 4b may include, for example, at least one polyolefin selected from polyethylene and polypropylene. The third layer 4c may include, for example, microbial cellulose nanofibers having an average particle diameter of 50 nm or less and wood-based cellulose nanofibers having an average particle diameter of 100 nm or more as the cellulose nanofibers.

Referring to FIGS. 3A to 3H, at least one of the first layer 4a, the second layer 4b, and the third layer 4c, included in the separator 4, may further include, or may not include at least one selected from a cross-linking agent, a binder, inorganic particles, and a polyolefin.

In the lithium battery according to certain embodiments, the cathode active material includes a lithium transition metal oxide including nickel and another transition metal. The content of nickel in the lithium transition metal oxide including nickel and another transition metal is 60 mol % or more, 65 mol % or more, 70 mol % or more, 75 mol % or more, 80 mol % or more, 85 mol % or more, 87 mol % or more, or 90 mol % or more with respect to the total number of moles of transition metals.

For example, the lithium transition metal oxide is represented by Formula 11:

$$Li_aNi_xCo_yM_zO_{2-b}A_b.$$ <Formula 11>

In Formula 11, $1.0 \leq a \leq 1.2$, $0 \leq b \leq 0.2$, $0.6 \leq x < 1$, $0 < y \leq 0.3$, $0 < z \leq 0.3$, and $x+y+z=1$ are satisfied; M is at least one selected from manganese (Mn), vanadium (V), magnesium (Mg), gallium (Ga), silicon (Si), tungsten (W), molybdenum (Mo), iron (Fe), chromium (Cr) Zinc (Zn), titanium (Ti), aluminum (Al), and boron (B); and A is F, S, Cl, Br, or a combination thereof. For example, $0.65 \leq x < 1$, $0 \leq 0.34$, $0 < z \leq 0.34$; $0.7 \leq x < 1$, $0 < y \leq 0.29$, $0 < z \leq 0.29$; $0.75 \leq x < 1$, $0 < y \leq 0.24$, $0 < z \leq 0.24$; $0.8 \leq x < 1$, $0 < y \leq 0.19$, $0 < z \leq 0.19$; $0.82 \leq x < 0.97$, $0 < y \leq 0.15$, $0 < z \leq 0.15$; $0.85 \leq x < 0.95$, $0 < y \leq 0.15$, and $0 < z \leq 0.15$ may be satisfied.

For example, the lithium transition metal oxide is represented by Formulae 12 or 13:

$$LiNi_xCo_yMn_zO_2$$ <Formula 12>

$$LiNi_xCo_yAl_zO_2.$$ <Formula 13>

In Formulae 12 and 13, $0.8 \leq x \leq 0.95$, $0 < y \leq 0.19$, and $0 < z \leq 0.19$ are satisfied. For example, $0.82 \leq x \leq 0.95$, $0 < y \leq 0.15$, and $0 < z \leq 0.15$ are satisfied. For example, $0.85 \leq x \leq 0.95$, $0 < y \leq 0.15$, and $0 < z \leq 0.15$ may be satisfied.

For example, the lithium transition metal oxide may be $LiNi_{0.7}Co_{0.2}Mn_{0.1}O_2$, $LiNi_{0.88}Co_{0.08}Mn_{0.04}O_2$, $LiNi_{0.8}Co_{0.15}Mn_{0.05}O_2$, $LiNi_{0.8}Co_{0.1}Mn_{0.1}O_2$, $LiNi_{0.88}Co_{0.1}Mn_{0.2}O_2$, $LiNi_{0.8}Co_{0.15}Al_{0.05}O_2$, $LiNi_{0.8}Co_{0.1}Mn_{0.2}O_2$, or $LiNi_{0.88}Co_{0.1}Al_{0.02}O_2$.

In a lithium battery according to certain embodiments, the anode active material includes at least one selected from a silicon-based compound, a carbon-based compound, a composite of a silicon-based compound and a carbon-based compound, and a silicon oxide ($SiO_x$, $0<x<2$). The carbon-based compound is, for example, graphite, but this is not particularly limited and may be any suitable carbon-based compound known in the art.

The composite of a silicon-based compound and a carbon-based compound may have a structure where silicon nanoparticles are disposed on a carbon-based compound, a composite where silicon nanoparticles are included on the surface of a carbon-based compound or inside the carbon-based compound, or a composite where silicon nanoparticles are coated with a carbon-based compound to included inside the carbon-based compound. The composite of a silicon-based compound and a carbon-based compound may be an active material obtained by dispersing silicon nanoparticles having an average particle diameter of about 200 nm or less on carbon-based compound particles and then performing carbon coating, or may be an active material where silicon (Si) nanoparticles exist on and in graphite. The composite of a silicon-based compound and a carbon-based compound may include secondary particles having an average particle diameter of about 5 μm to about 20 μm. The average particle diameter of the silicon nanoparticles may be 5 nm or more, 10 nm or more, 20 nm or more, 50 nm or more, or 70 nm or more. The average particle diameter of the silicon nanoparticles may be 200 nm or less, 150 nm or less, 100 nm or less, 50 nm or less, 20 nm or less, or 10 nm or less. For example, the average particle diameter of the silicon nanoparticles may be about 100 nm to about 150 nm.

The average particle diameter of the secondary particles of the composite of a silicon-based compound and a carbon-based compound may be about 5 μm to about 18 μm, about 7 μm to about 18 μm, about 7 μm to about 15 μm, or about 10 μm to about 13 μm.

In the lithium battery according to certain embodiments, after the lithium battery is charged up to 100% of state of charge (SOC) and then exposed to heat at 170° C. for 1 hour, a voltage of the lithium battery after the heat exposure is 90% or more, 93% or more, or 95% or more a voltage of the lithium battery before the heat exposure.

The lithium battery may be manufactured using, for example, the following method, but the present disclosure is not limited thereto, and the method may be any fabrication method known in the art that enables the operation of a lithium battery.

First, an anode is prepared according to an anode fabrication method.

An anode active material, a conductive material, a binder, and a solvent may be mixed to prepare an anode active material composition, and the anode active material composition may be directly coated on a current collector such as copper foil or the like to thereby fabricate an anode plate. Alternately, the anode active material composition may be cast on a separate support and an anode active material film separated from the support may be laminated on a copper current collector to thereby fabricate an anode plate. The anode is not limited to the above-described type, and may be of other types known in the art.

The anode active material in the lithium battery may be any anode active material known in the art. For example, the anode active material may include at least one selected from lithium metal, a metal alloyable with lithium, a transition metal oxide, a non-transition metal oxide, and a carbonaceous material.

For example, the metal alloyable with lithium may be silicon (Si), tin (Sn), aluminum (Al), germanium (Ge), lead (Pb), bismuth (Bi), antimony (Sb), a Si-yttrium (Y) alloy (Y is an alkali metal, an alkali earth metal, a Group 13 to 16 element, a transition metal, a rare earth element, or a combination thereof except for Si), a Sn—Y alloy (Y is an alkali metal, an alkali earth metal, a Group 13 to 16 element, a transition metal, a rare earth element, or a combination thereof except for Sn), or the like. Examples of Y include magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), and any combination thereof.

The transition metal oxide may be, for example, lithium titanium oxide, vanadium oxide, lithium vanadium oxide, or the like.

The non-transition metal oxide may be, for example, $SnO_2$, $SiO_x$ where $0<x<2$, or the like.

The carbonaceous material may be crystalline carbon, amorphous carbon, or a mixture thereof. Examples of the crystalline carbon include natural graphite and artificial graphite, each of which has an irregular form or a plate, flake, spherical, or fibrous form. Examples of the amorphous carbon include, but are not limited to, soft carbon (low-temperature calcined carbon), hard carbon, mesophase pitch carbide, and calcined coke.

The anode active material includes at least one selected from a silicon-based compound, a carbon-based compound, a composite of a silicon-based compound and a carbon-based compound, and a silicon oxide ($SiO_x$, $0<x<2$). The conductive material may be acetylene black, natural graphite, artificial graphite, carbon black, Ketjen black, carbon fiber, metallic powder such as copper, nickel, aluminum, silver, or the like, metal fiber, or the like. In some embodiments, conductive materials such as polyphenylene derivatives and the like may be used alone or a mixture of two or more of these materials may be used, but the present disclosure is not limited to the above-listed examples. Any conductive material that is known in the art may be used. In addition, the above-described carbonaceous materials may also be used as a conductive material.

Examples of the binder in the anode include a vinylidene fluoride/hexafluoropropylene copolymer, polyvinylidene fluoride (PVDF), polyacrylonitrile, polymethyl methacrylate, polytetrafluoroethylene, a mixture of the aforementioned polymers, and a styrene-butadiene rubber-based polymer. However, the binder is not particularly limited to the above examples and may be any binder that is known in the art.

The solvent in the anode may be N-methylpyrrolidone, acetone, water, or the like. However, the solvent is not particularly limited to the above examples and may be any solvent known in the art.

The amounts of the negative active material, the conductive material, the binder, and the solvent may be the same levels as those generally used in a lithium battery. At least one of the conductive material and the solvent may not be used according to the use and constitution of desired lithium batteries.

Next, a cathode is prepared according to a cathode fabrication method.

The cathode may be fabricated in the same manner as in anode fabrication method, except that a cathode active material is used instead of the anode active material. In addition, in a cathode active material composition, a conductive material, a binder, and a solvent may be the same as those used in the anode.

A cathode active material, a conductive material, a binder, and a solvent may be mixed to prepare a cathode active material composition, and the cathode active material composition may be directly coated on an aluminum current collector to thereby fabricate a cathode plate. Alternately, the cathode active material composition may be cast onto a separate support and a cathode active material film separated from the support may be laminated on an aluminum current collector to thereby fabricate a cathode plate. The cathode is not limited to the above-described type, and may be of other types known in the art.

The cathode active material may include at least one selected from lithium cobalt oxide, lithium nickel cobalt manganese oxide, lithium nickel cobalt aluminum oxide, lithium iron phosphate, and lithium manganese oxide. However, the positive active material is not limited to the above examples and any cathode active material used in the art may be used.

For example, the cathode active material may be a compound represented by one of the following formulae: $Li_aA_{1-b}B_{1-b}D_2$ where $0.90 \le a \le 1.8$ and $0 \le b \le 0$; $Li_aE_{1-b}B_bO_{2-c}D_c$ where $0.90 \le a \le 1.8$, $0 \le b \le 0.5$, and $0 \le c \le 0.05$; $LiE_{2-b}B_bO_{4-c}D_c$ where $0 \le b \le 0.5$ and $0 \le c \le 0.05$; $Li_aNi_{1-b-c}Co_bB_cD_\alpha$ where $0.90 \le a \le 1.8$, $0 \le b \le 0.5$, $0 \le c \le 0.05$, and $0 < \alpha \le 2$; $Li_aNi_{1-b-c}Co_bB_cO_{2-\alpha}F_\alpha$ where $0.90 \le a \le 1.8$, $0 \le b \le 0.5$, $0 \le c \le 0.05$, and $0 < \alpha < 2$; $Li_aNi_{1-b-c}Co_bB_cO_{2-\alpha}F_2$ where $0.90 \le a \le 1.8$, $0 \le b \le 0.5$, $0 \le c \le 0.05$, and $0 < \alpha < 2$); $Li_aNi_{1-b-c}Mn_bB_cD_\alpha$ where $0.90 \le a \le 1.8$, $0 \le b \le 0.5$, $0 \le c \le 0.05$, and $0 < \alpha \le 2$; $Li_aNi_{1-b-c}Mn_bB_cO_{2-\alpha}F_\alpha$ where $0.90 \le a \le 1.8$, $0 \le b \le 0.5$, $0 \le c \le 0.05$, and $0 < \alpha < 2$; $Li_aNi_{1-b-c}Mn_bB_cO_{2-\alpha}F_2$ where $0.90 \le a \le 1.8$, $0 \le b \le 0.5$, $0 \le c \le 0.05$, and $0 < \alpha < 2$; $Li_aNi_bE_cG_dO_2$ where $0.90 \le a \le 1.8$, $0 \le b \le 0.9$, $0 \le c \le 0.5$, and $0.001 \le d \le 0.1$; $Li_aNi_bCo_cMn_dGeO_2$ where $0.90 \le a \le 1.8$, $0 \le b \le 0.9$, $0 \le c \le 0.5$, $0 \le d \le 0.5$, and $0.001 \le e \le 0.1$; $Li_aNiG_bO_2$ where $0.90 \le a \le 1.8$ and $0.001 \le b \le 0.1$; $Li_aCoG_bO_2$ where $0.90 \le a \le 1.8$ and $0.001 \le b \le 0.1$; $Li_aMnG_bO_2$ where $0.90 \le a \le 1.8$ and $0.001 \le b \le 0.1$; $Li_aMn_2G_bO_4$ where $0.90 \le a \le 1.8$ and $0.001 \le b \le 0.1$; $QO_2$; $QS_2$; $LiQS_2$; $V_2O_5$; $LiV_2O_5$; $LiIO_2$; $LiNiVO_4$; $Li_{(3-f)}J_2(PO_4)_3$ where $0 \le f \le 2$; $Li_{(3-f)}Fe_2(PO_4)_3$ where $0 \le f \le 2$; and $LiFePO_4$.

In the formulae above, A may be selected from nickel (Ni), cobalt (Co), manganese (Mn), and a combination thereof; B may be selected from aluminum (Al), Ni, Co, Mn, chromium (Cr), iron (Fe), magnesium (Mg), strontium (Sr), vanadium (V), a rare earth element, and a combination thereof; D may be selected from oxygen (O), fluorine (F), sulfur (S), phosphorus (P), and a combination thereof; E may be selected from Co, Mn, and a combination thereof; F may be selected from F, S, P, and a combination thereof; G may be selected from Al, Cr, Mn, Fe, Mg, lanthanum (La), cerium (Ce), Sr, V, and a combination thereof; Q is selected from titanium (Ti), molybdenum (Mo), Mn, and a combination thereof; I is selected from Cr, V, Fe, scandium (Sc), yttrium (Y), and a combination thereof; and J may be selected from V, Cr, Mn, Co, nickel (Ni), copper (Cu), and a combination thereof.

The cathode active material may be, for example, a composite further having a coating layer on a surface of the above-listed compound, or a mixture of the above-listed compound and a compound having a coating layer. The coating layer may include a coating element compound, such as an oxide or hydroxide of a coating element, an oxyhydroxide of a coating element, an oxycarbonate of a coating element, or a hydroxycarbonate of a coating element. These compounds constituting the coating layers may be amorphous or crystalline. The coating element included in the coating layer may be, for example, magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof. A coating layer may be formed using the aforementioned compounds and the coating elements constituting the compounds of the coating layers by using any one of various coating methods that do not adversely affect physical properties of the cathode active material. The coating method may be, for example, spray coating, dipping, or the like. The coating method is well understood by those of ordinary skill in the art, and thus, a detailed description thereof is omitted herein.

According to certain embodiments, the cathode active material is the aforementioned lithium transition metal oxide represented by formulae 1 to 3 above.

Next, the aforementioned separator including cellulose nanofibers is disposed between the cathode and the anode. An electrolyte including at least one selected from an ionic metal complex compound represented by the formula 1 and a lithium salt containing a sulfonyl group (—S(=O)2-) is injected into the separator and thus the separator is impregnated with the injected electrolyte.

Figure 4:
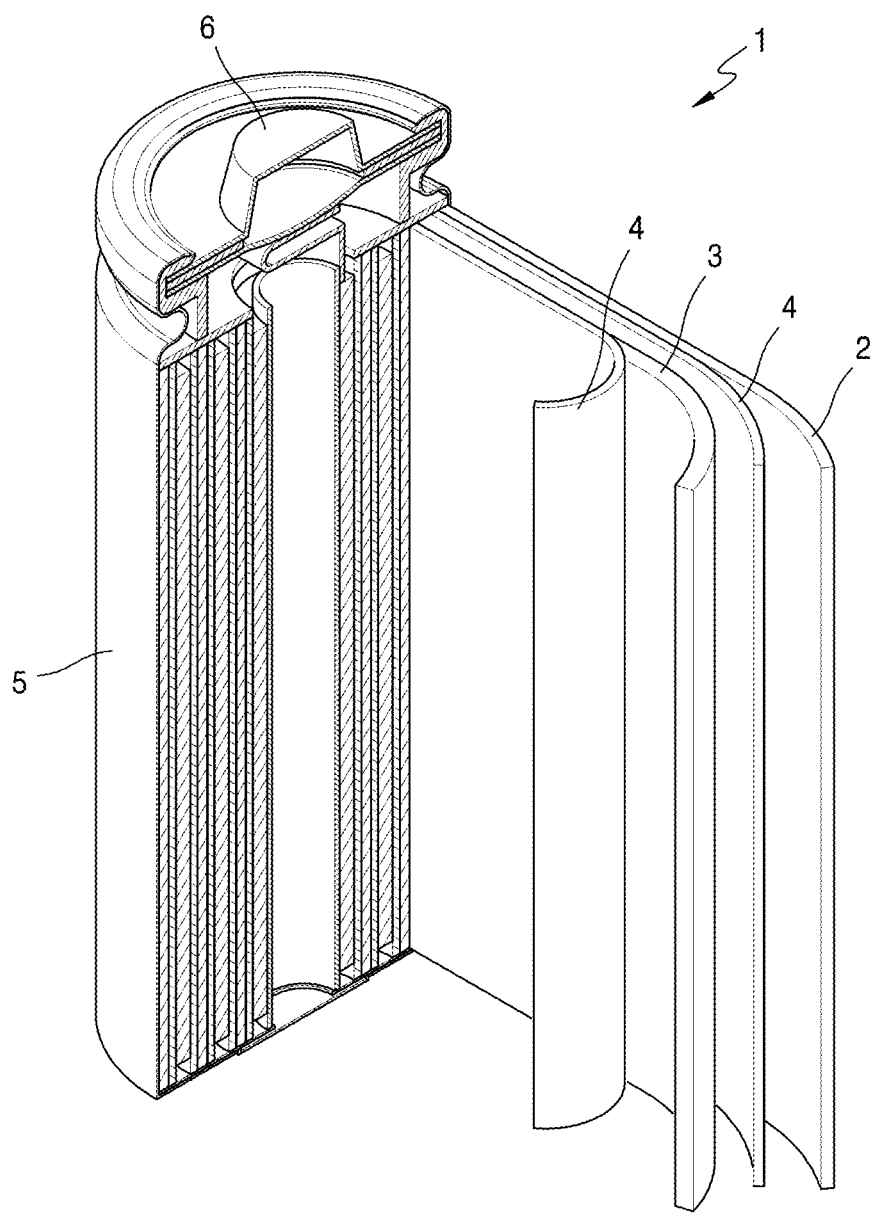
FIG. 4 is a schematic view of a lithium battery according to an embodiment.

Referring to FIG. 4, a lithium battery 1 includes a cathode 3, an anode 2, and a separator 4. The cathode 3, the anode 2, and the separator 4 are wound or folded to be accommodated in a battery case 5. Subsequently, an organic electrolyte solution is injected into the battery case 5 and the battery case 5 is sealed with a cap assembly 6 to thereby complete the manufacture of the lithium battery 1. The battery case 5 may be of a cylindrical type, a rectangular type, a pouch type, a coin type, or the like. The lithium battery 1 may be, for example, a thin-film type battery. The lithium battery 1 may be, for example, a lithium ion battery.

The separator is disposed between the cathode and the anode to thereby form a battery assembly. A plurality of battery assemblies may be stacked in a bi-cell structure, and then impregnated with an organic electrolyte solution, and the obtained resulting structure is accommodated in a pouch and sealed, thereby completing the manufacture of a lithium-ion polymer battery.

A battery assembly or a plurality of battery assemblies form a battery module, and a plurality of battery modules are stacked to form a battery pack. The battery pack may be used in any device that requires high capacity and high output. For example, the battery pack may be used in a laptop computer, a smart phone, an electric vehicle, or the like.

The lithium battery has excellent rate capability and excellent lifespan characteristics, and is thus suitable for use in electric vehicles (EVs). For example, the lithium battery is suitable for use in hybrid vehicles such as plug-in hybrid electric vehicles (PHEVs) and the like.

The separator according to certain embodiments is illustratively prepared by the following method, but the present disclosure is not necessarily limited thereto. Any preparation method known in the art that enables the preparation of a separator as a porous film may be used.

A method of preparing a separator includes: preparing a composition including cellulose nanofibers, a hydrophilic pore-forming agent, and a solvent and applying the composition onto a substrate; drying the composition to form a sheet on the substrate; and separating the sheet from the substrate to obtain a separator consisting of the sheet. Inclusion of cellulose nanofibers, improves both the mechanical properties and air permeability of the separator, thus improving both the energy density and power of a lithium battery including the separator.

In the separator preparation method, water is used as a solvent, but the solvent is not particularly limited. Any organic solvent known in the art, such as methanol, ethanol, propanol, butanol, or acetone may be used.

In the separator preparation method according to certain embodiments, the composition further includes at least one selected from a cross-linking agent and a binder. Inclusion of a cross-linking agent and/or a binder further enhances tensile strength of the separator. The types of the cross-linking agent and the binder are the same as those of the cross-linking agent and the binder included in the aforementioned embodiment of a separator.

In certain embodiments, the hydrophilic pore-forming agent may be at least one selected from: pore-forming agents in a liquid state at room temperature such as polyethylene glycol, ethylene carbonate, propylene carbonate, vinylene carbonate, propanesulfone, ethylenesulfate, dimethylsulfone, ethyl methyl sulfone, dipropyl sulfone, dibutyl sulfone, trimethylene sulfone, tetramethylene sulfone, di(methoxyethyl)sulfone ($CH_3OCH_2CH_2)_2SO_2$), and ethyl cyclopentyl sulfone ($C_2H_5SO_2C_5H_9$); and pore-forming agents in a liquid state at room temperature such as 1,5-pentanediol, 1-methylamino-2,3-propanediol, ε-caprolactone, γ-butyrolactone, α-acetyl-γ-butyrolactone, diethylene glycol, 1,3-butylene glycol, propylene glycol, triethylene glycol dimethyl ether, tripropylene glycol dimethyl ether, diethylene glycol monobutyl ether, triethylene glycol monomethyl ether, triethylene glycol butyl methyl ether, tetraethylene glycol dimethyl ether, diethylene glycol monoethyl ether acetate, diethylene glycol monoethyl ether, triethylene glycol monobutyl ether, tetraethylene glycol monobutyl ether, dipropylene glycol monomethyl ether, diethylene glycol monomethyl ether, diethylene glycol monoisopropyl ether, ethylene glycol monoisobutyl ether, tripropylene glycol monomethyl ether, diethylene glycol methyl ethyl ether, diethylene glycol diethyl ether, glycerin, propylene carbonate, and N-methylpyrrolidone. However, the present disclosure is not limited to the above examples, and any pore-forming agent known in the art may be used.

In a case in which the hydrophilic pore-forming agent in a solid state is used at room temperature, the content of water decreases as the water evaporates from the composition, such that an amount of the residual pore-forming agent exceeds the solubility of the pore-forming agent in water; pore-forming agents in a solid state at room temperature are precipitated from water and distributed and disposed within a sheet in a solid state; and thus, additional agglomeration or a rearrangement of the precipitated pore-forming agent, which is already distributed within the sheet, due to additional evaporation of water is suppressed. Thus, the pore size and pore distribution uniformity of the separator are further enhanced.

The method of preparing a separator further includes: washing the sheet or the separator with an organic solvent. By washing the sheet or the separator with an organic solvent, the pore-forming agent remaining in the sheet or the separator is effectively removed. The washing method and the number of washing operations are not limited and the washing process may be performed once or more to adjust physical properties of the separator. The organic solvent used to wash the sheet or the separator may be any organic solvent used in the art that is capable of dissolving a hydrophilic pore-forming agent in a solid state at room temperature. For example, toluene is used as the organic solvent. After removing the hydrophilic pore-forming agent using the organic solvent in the separator preparation method, the temperature and time for drying the washed separator are not particularly limited, but the separator may be dried, for example, at a temperature between about 20° C.

and about 120° C. for about 1 minute to about 10 hours. The drying process is performed at atmospheric pressure or in a vacuum oven.

In the separator preparation method, the composition includes water as a solvent, but the present disclosure is not necessarily limited thereto. Alternately, the composition further includes, in addition to water, other solvents capable of dissolving cellulose nanofibers and a hydrophilic pore-forming agent in a solid state at room temperature.

In the separator preparation method, the amount of the cellulose nanofibers included in the composition is, for example, about 0.01 wt % to about 50 wt %, about 0.05 wt % to about 40 wt %, about 0.1 wt % to about 30 wt %, about 0.2 wt % to about 20 wt %, about 0.3 wt % to about 15 wt %, about 0.3 wt % to about 10 wt %, about 0.35 wt % to about 8 wt %, about 0.4 wt % to about 6 wt %, or about 0.4 wt % to about 5 wt %, with respect to the total weight of the composition. When the amount of the cellulose nanofibers is too small, an excessively large amount of time is consumed in drying or the like, productivity is reduced, and the tensile strength of the separator is reduced. When the amount of the cellulose nanofibers is too large, the viscosity of the composition is excessively increased, and thus it is difficult to obtain a uniform sheet.

In the separator preparation method, the drying temperature of water is not particularly limited, but the drying process is performed at a temperature between about 50° C. and about 120° C. for about 1 minute to about 10 hours. The drying process is performed at atmospheric pressure or in a vacuum oven.

Hereinafter, the present disclosure will be described in further detail with reference to the following examples and comparative examples. However, these examples are provided for illustrative purposes only and are not intended to limit the scope of the present disclosure.

PREPARATION OF CELLULOSE NANOFIBERS

Preparation Example 1: Preparation of Carboxyl Group-Containing Microbial Cellulose Nanofibers A wild-type *Gluconacetobacter xylinum* strain (KCCM 41431) was placed in 700 ml of a Hestrin-Schramm (HS) medium supplemented with 1.0 w/v % carboxymethylcellulose (CMS) (Na-CMC, SIGMA) having a molecular weight of 250,000 Daltons in a 1 L fermenter (Hanil Science Industry Corporation, GX LiFlus Series Jar-type open system, positive pressure maintained to prevent contamination), and cultured at 30° C. for 48 hours while being stirred at 200 rpm using an impeller. The HS medium contained 20 g/L of glucose, 5 g/L of bacto-peptone, 5 g/L of a yeast extract, 2.7 g/L of $Na_2HPO_4$, and 1.15 g/L of citric acid, in water.

A fermentation solution, in which carboxyl group-containing cellulose nanofibers produced as a result of culturing were uniformly dispersed, was collected. The collected fermentation solution was allowed to pass twice through a microchannel (Interaction chamber, size: 200 μm) of a Nano Disperser (Ilshin Autoclave, ISA-NH500, Korea), which is a high-pressure homogenizer, in a state in which 70 MPa was applied thereto, to thereby obtain a high-pressure homogenized fermentation solution including carboxyl group-containing cellulose nanofibers. The high-pressure homogenized fermentation solution including carboxyl group-containing cellulose nanofibers was centrifuged to obtain a cellulose precipitate. The obtained precipitate was heated at 90° C. in a 0.1N aqueous NaOH solution for 2 hours to hydrolyze cells and impurities present between the carboxyl group-containing cellulose nanofibers, followed by rinsing with distilled water, thereby obtaining purified carboxyl group-containing cellulose nanofibers.

The prepared carboxyl group-containing cellulose nanofibers had an average diameter of 18 nm, the content of carboxyl groups was 0.11 mmol/g, and a weight average polymerization degree thereof was 5531 DPw.

PREPARATION OF SEPARATOR

Preparation Example 2

0.6 mg (2 wt % of total amount of dispersion) of propylene carbonate as a pore-forming agent was added to 30 ml of a 0.5 wt % (based on microbial cellulose nanofiers) dispersion in which a mixture of the microbial cellulose nanofibers of Preparation Example 1 and carboxymethylcellulose (CMC (Na-CMC, SIGMA)) in a weight ratio of 100:20 was diluted with water, and the resulting solution was stirred at 1,000 rpm and at room temperature for 1 hour. The obtained composition was applied onto a polyester film substrate to a thickness of 1.5 mm using a micrometer adjustable applicator, and dried at 85° C. for 3 hours to remove water and propylene carbonate to thereby obtain a porous film. The obtained porous film was not a woven film, but non-woven fabric. The obtained porous film was used as a separator as it was.

MANUFACTURE OF LITHIUM BATTERY

Example 1

(Manufacture of Cathode)

A cathode in which a mixture of $LiNi_{0.6}Co_{0.2}Mn_{0.2}O_2$ and $LiNi_{0.8}Co_{0.15}Al_{0.05}O_2$ in a weight ratio of 8:2 as a cathode active material, a carbon conductive material (Denka Black), and polyvinylidene fluoride (PVdF) are mixed in a weight ratio of 96:1.8:2.2 was used.

(Manufacture of Anode)

An anode in which graphite particles, a styrene-butadiene rubber (SBR) as a binder, and carboxymethylcellulose (CMC) are mixed in a weight ratio of 98:1.2:0.8 was used.

(Manufacture of Lithium Battery)

The separator prepared according to Preparation Example 2 was used.

The porous film of Preparation Example 2 was interposed between the cathode and the anode, and then the resulting structure was accommodated in a pouch and an electrolyte solution was injected thereinto, followed by sealing, thereby manufacturing a pouch cell.

An electrolyte solution in which an ionic metal complex represented by Formula 9 below is saturated in a mixed solvent of ethylene carbonate (EC):ethyl methyl carbonate (EMC):dimethyl carbonate (DMC) (volume ratio: 2:4:4) was used as the electrolyte solution.

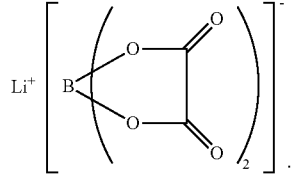

<Formula 9>

Example 2

A pouch cell was manufactured in the same manner as in Example 1, except that an electrolyte solution in which 1.15 M Li(CF$_3$SO$_2$)$_2$N is dissolved instead of the ionic metal complex represented by Formula 9 was used.

Comparative Example 1

A pouch cell was manufactured in the same manner as in Example 1, except that an electrolyte solution in which 1.15 M LiPF$_6$ is dissolved instead of the ionic metal complex represented by Formula 9 was used.

Comparative Example 2

A pouch cell was manufactured in the same manner as in Example 1, except that an electrolyte solution in which 1.15 M LiBF$_4$ is dissolved instead of the ionic metal complex represented by Formula 9 was used.

Evaluation Example 1: Measurement of Differential Scanning Calorimetry (DSC) of Separator The separator prepared in Preparation Example 2 was impregnated with each of the electrolyte solutions used in Example 1, Example 2, and Comparative Example 1, and then a DSC thermogram was measured, and the results thereof are shown in FIG. 1.

As shown in FIG. 1, the separator impregnated with each of the electrolytic solution used in Examples 1 and 2 had no significant change in the DSC thermogram up to 200° C. That is, it was found that the separator impregnated with each of the electrolytic solution used in Examples 1 and 2 was not subjected to an exothermic reaction up to 200° C.

In contrast, in the separator impregnated with the electrolytic solution used in Comparative Example 1, at 170° C., the slope of the DSC thermogram increased and then decreased again. That is, an exothermic reaction peak expressed by a differential value (dH/dT) corresponding to the slope of the thermogram was obtained near 170° C. Therefore, it was found that the separator impregnated with the electrolytic solution used in Comparative Example 1 was subjected to an exothermic reaction at 170° C.

Evaluation Example 2: Evaluation of Crystallinity of Separator

The XRD of the separator prepared in Preparation Example 2 was measured, and the crystalline index of the separator, which is an intensity ratio (($I_{002}-I_{AM}$)/$I_{002}$) of a crystalline peak intensity ($I_{002}-I_{AM}$) to a total peak intensity $I_{002}$ of a (002) crystal plane, was 0.64, wherein the crystalline peak intensity is a difference between the total peak intensity $I_{002}$ of the (002) crystal plane and a peak intensity lane of an amorphous phase. After the separator prepared in Preparation Example 2 was impregnated with the electrolytic solution used in Comparative Example 1, the separator was sealed, left near 170° C. for 3 hours, exposed to heat while blocking moisture in a dry room under an inert gas atmosphere, and then the XRD of the separator was measured to obtain a crystalline index of 0.26. The crystalline index of the separator after heat exposure was 40.6% of the crystalline index of the separator before heat exposure.

Meanwhile, in the separator impregnated with the electrolyte solution used in Example 2, the crystalline index of the separator after heat exposure was 97% of the crystalline index of the separator before heat exposure.

Evaluation Example 3: Evaluation of Carbonization of Separator

After the separator prepared in Preparation Example 2 was impregnated with each of the electrolyte solutions used in Examples 1 and 2 and Comparative Examples 1 and 2 and a mixed solvent of EC (ethylene carbonate):EMC (ethylmethyl carbonate):DMC (dimethyl carbonate) (volume ratio: 2:4:4), the separator was sealed, heated at about 170° C. for 3 hours while blocking moisture in a dry room under an inert gas atmosphere, and then the carbonization of the separator was evaluated with the naked eye.

Separately, the separator prepared in Preparation Example 2 was not impregnated with the electrolyte solution, and the carbonization of the separator was evaluated under the same conditions.

Figure 2A:
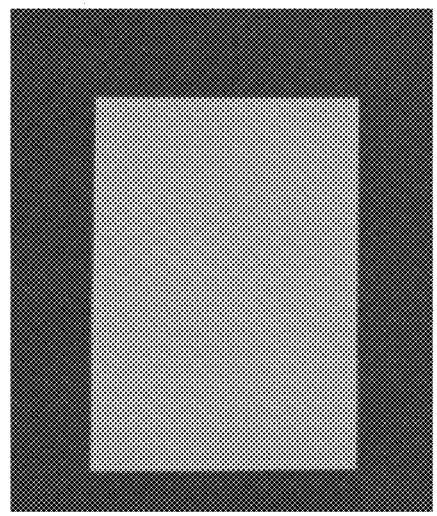
FIG. 2A is an image of a separator not impregnated with an electrolyte solution after heat exposure.

FIG. 2A is an image of a separator not impregnated with an electrolyte solution after heat exposure.

Figure 2B:
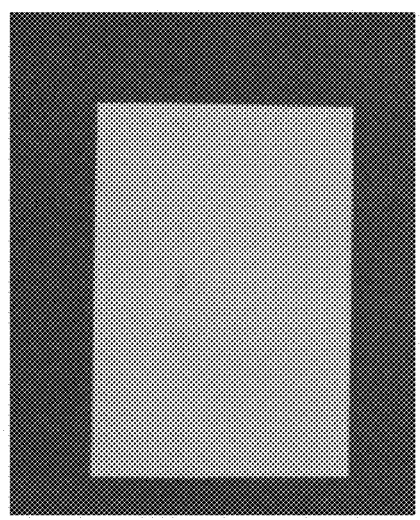
FIG. 2B is an image of a separator impregnated with a mixed solvent after heat exposure.

FIG. 2B is an image of a separator impregnated with a mixed solvent after heat exposure.

Figure 2C:
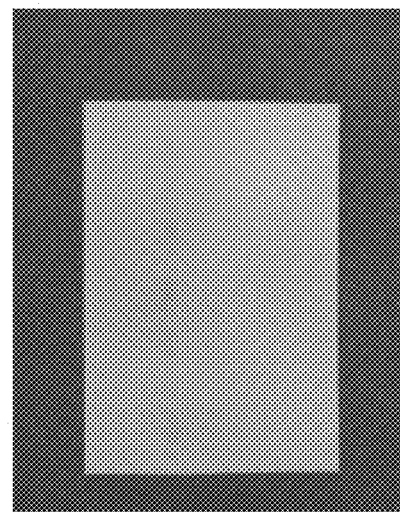
FIG. 2C is an image of a separator impregnated with the electrolyte solution used in Example 2 after heat exposure.

FIG. 2C is an image of a separator impregnated with the electrolyte solution used in Example 2 after heat exposure.

Figure 2D:
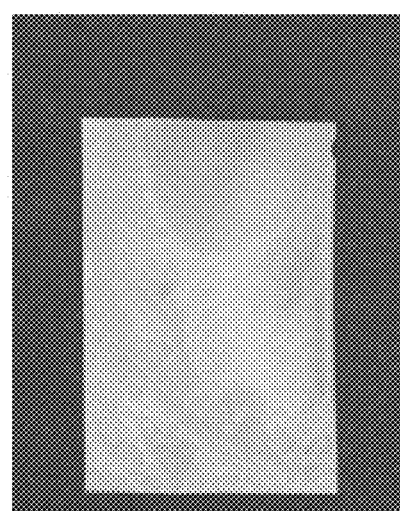
FIG. 2D is an image of a separator impregnated with the electrolyte solution used in Example 1 after heat exposure.

FIG. 2D is an image of a separator impregnated with the electrolyte solution used in Example 1 after heat exposure.

Figure 2E:
FIG. 2E is an image of a separator impregnated with the electrolyte solution used in Comparative Example 1 after heat exposure.

FIG. 2E is an image of a separator impregnated with the electrolyte solution used in Comparative Example 1 after heat exposure.

Figure 2F:
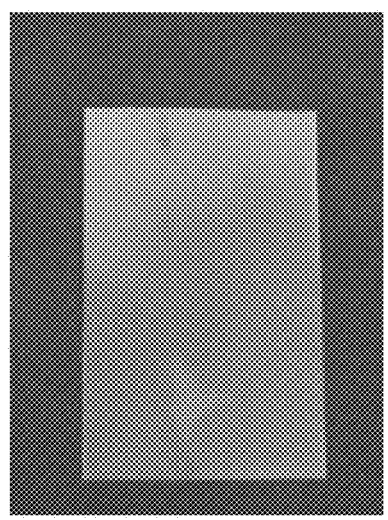
FIG. 2F is an image of a separator impregnated with the electrolyte solution used in Comparative Example 2 after heat exposure.

FIG. 2F is an image of a separator impregnated with the electrolyte solution used in Comparative Example 2 after heat exposure.

As shown in FIGS. 2C to 2D, in the separators impregnated with the electrolyte solutions of Examples 1 and 2, there was substantially no carbonized area on the surface of the separator even after heat exposure. The surfaces of the separators impregnated with the electrolyte solutions of Examples 1 and 2 are similar to the surfaces of the separator not impregnated with the electrolyte solution and the separator impregnated with the mixed solvent.

In contrast, as shown in FIG. 2E, in the separator impregnated with the electrolyte solution of Comparative Example 1, the surface of the separator after heat exposure was entirely carbonized. Further, as shown in FIG. 2F, in the separator impregnated with the electrolyte solution of Comparative Example 2, the surface of the separator after heat exposure was partially carbonized.

Therefore, in the lithium batteries of Examples 1 and 2, the carbonization of the separator caused by a side reaction of the electrolyte solution and the separator was prevented.

Evaluation Example 4: Evaluation of Charge/Discharge Characteristics

Each of the lithium batteries (pouch cells) manufactured according to Examples 1 and 2 and Comparative Example 1 was charged at a constant current of 0.1 C rate at 25° C. until a voltage reached 4.2 V (vs. Li), and was then encapsulated again after removing a gas generated by disassembling the pouch cell. After completing the gas removal, each pouch cell was charged at a constant current of 0.2 C rate until a voltage reached 4.2 V (vs. Li), and was charged at a constant voltage maintained at 4.3 V until a current reached 0.05 C. Each of the completely pouch cells was rested for 10 minutes, and was then discharged at a constant current of 0.2 C until the voltage reached 2.8 V (vs. Li) ($1^{st}$ cycle, formation process).

Each pouch cell having gone through the formation process was charged at a constant current of 0.2 C rate until the voltage reached 4.3 V (vs. Li), and charged at a constant voltage maintained at 4.3 V until the current reached 0.05 C. Each of the completely charged pouch cells was rested for 10 minutes, and then each pouch cell was discharged at a constant current of 0.2 C until the voltage reached 2.8 V (vs. Li). This cycle of charging and discharging was repeated two times ($2^{nd}$~$3^{rd}$ cycles).

Subsequently, each pouch cell was charged at a constant current of 0.2 C rate at 25° C. until the voltage reached 4.3 V (vs. Li), and charged at a constant voltage maintained at 4.3 V until the current reached 0.05 C. That is, each pouch cell was charged up to 100% of state of charge (SOC), that is, up to full charge capacity (FCC).

The charged lithium battery was left in an oven at 170° C. for 1 hour and exposed to heat, and the a battery voltage was measured.

In the lithium batteries prepared in Examples 1 and 2, the voltage of the lithium battery after the heat exposure is 90% or more of the voltage of the lithium battery before the heat exposure, so that a voltage drop was insignificant.

In contrast, in the lithium battery prepared in Comparative Example 1, the voltage of the lithium battery after the heat exposure is 80% or less of the voltage of the lithium battery before the heat exposure, so that a voltage drop was remarkable.

Therefore, in the lithium batteries of Examples 1 and 2, the voltage drop of the lithium battery caused by side reactions due to heat exposure was suppressed, as compared with the lithium battery of Comparative Example 1. As a result, the reduction in output power of the lithium battery was suppressed.

Evaluation Example 5: Measurement of Whether Carboxyl Group was Present

The presence or absence of a carboxyl group was evaluated by measuring an IR spectrum of the cellulose nanofibers prepared in Preparation Example 1.

In the cellulose nanofibers of Preparation Example 1, a peak appeared in the vicinity of 1,572 cm$^{-1}$ corresponding to a carboxyl group, from which it was found that a carboxyl group was included therein.

Evaluation Example 6: Measurement of Content of Carboxyl Group

The content of a carboxyl group in the cellulose nanofibers of Preparation Example 1 was measured, and the results thereof are shown in Table 1 below. The content of the carboxyl group may be measured by any one of electrical conductivity titration and ion chromatography, but a combination of these methods was used herein to increase accuracy.

1. Electrical Conductivity Titration

The content of the carboxyl group was measured by electrical conductivity titration (Metrohm). 0.05 g of the cellulose nanofibers (CNFs) of Preparation Example 2 that were freeze-dried, 27 ml of distilled water, and 3 ml of 0.01 M NaCl were added to a 100 ml beaker, and the pH of the resulting solution was adjusted with 0.1 M HCl to pH 3 or less. Subsequently, 0.2 ml of a 0.04 M NaOH solution was added dropwise to the beaker until pH reached 10.5, and from a conductivity and pH curve, the carboxyl group content was calculated by Equation 1 below. The measurement results thereof are shown in Table 1 below.

Carboxyl group content (mmol/g)=[0.04 M×volume of dropwise-added NaOH (m L)]/0.05 g   <Equation 1>

2. Ion Chromatography 5 ml of 12 mM HCl was added to 0.015 g of the cellulose nanofibers (CNFs) of Preparation Example 2 that were freeze-dried, followed by sonication for 1 hour. After maintaining the resulting solution at room temperature for 15 hours, the content of Na$^+$ in the solution was analyzed by ion chromatography and the carboxyl group content was calculated from the content of Na$^+$ using Equation 2 below.

Carboxyl group content (mmol/g)=[mmol of Na$^+$]/0.015 g   <Equation 2>

Evaluation Example 7: Measurement of Average Diameter of Cellulose Nanofibers The diameter of the cellulose nanofibers (CNFs) of Preparation Example 1 was measured such that several images of an appropriately diluted CNF solution were acquired using a transmission electron microscope (TEM) (manufactured by Titan Cubed, Super TEM), and were used to measure the diameter and length of 100 cellulose nanofibers using an image analyzer, and an average diameter and average length thereof were calculated. In addition, a full width at half maximum (FWHM) was calculated from a diameter distribution curve illustrating the number of cellulose nanofibers according to the diameter of 100 cellulose nanofibers. The measurement results thereof are shown in Table 1 below.

Evaluation Example 8: Measurement of Weight Average Polymerization Degree of Cellulose Nanofibers A degree of polymerization (DP) of the cellulose nanofibers (CNFs) of Preparation Example 1 was calculated by a degree of polymerization determined by viscosity measurement (DPv) and a weight average degree of polymerization (DPw).

5 mg of the freeze-dried CNFs was collected, and then 10 ml of pyridine and 1 ml of phenyl isocyanate were added into a 12 ml vial to induce a derivatization reaction at 100° C. for 48 hours. 2 ml of methanol was added to the sample, followed by washing twice with 100 ml of 70% methanol and washing twice with 50 ml of H$_2$O. Subsequently, the molecular weight, molecular weight distribution, and length distribution of the CNFs were measured by gel permeation chromatography (GPC). GPC was performed using a Waters 2414 refractive index detector and a Waters Alliance e2695 separation module (Milford, MA, USA) equipped with three columns, i.e., Styragel HR2, HR4, and HMW7 columns. As an eluent, chloroform was used at a flow rate of 1.0 ml/min. The concentration of the sample was 1 mg/ml and an injection volume thereof was 20 µl. Polystyrene standards (PS) (#140) were used as references. The measurement results thereof are shown in Table 1 below.

TABLE 1

|  | Carboxyl group content [mmol/g] | Average diameter [nm] | FWHM [nm] | Average weight degree of polymerization [DPw] |
|---|---|---|---|---|
| Preparation Example 1 | 0.11 | 18 | 23 | 5531 |

Referring to Table 1, it was found that carboxyl group-containing cellulose nanofibers were obtained.

As is apparent from the foregoing description, according to an embodiment, a side reaction of a separator with an electrolyte is suppressed at high temperature, thereby suppressing the deterioration of power of a lithium battery.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

What is claimed is:

1. A lithium battery comprising:
a cathode comprising a cathode active material;
an anode comprising an anode active material;
an electrolyte disposed between the cathode and the anode; and
a separator impregnated with the electrolyte,
wherein the separator comprises cellulose nanofibers, and
wherein a differential scanning calorimetry (DSC) thermogram of the separator impregnated with the electrolyte does not show an exothermic reaction peak as represented by a differential value (dH/dT) within a temperature range of about 150° C. to about 200° C.,
wherein the cellulose nanofibers comprise carboxyl group-containing microbial cellulose nanofibers,
wherein the carboxyl group of the carboxyl group-containing microbial cellulose nanofibers is bound to a carbon atom of a pyranose ring and is represented by Formula a or b below:

—R$_1$—O—R$_2$—COOM  <Formula a>

—O—R$_2$—COOM,  <Formula b> wherein R$_1$ and R$_2$ are each independently a substituted or unsubstituted C$_1$-C$_{10}$ alkylene group, and M is hydrogen or an alkali metal.

2. The lithium battery of claim 1, wherein the separator impregnated with the electrolyte has a crystalline index after exposure to heat at 170° C. for 3 hours under an inert atmosphere that is 50% or more of the crystalline index of the separator before the heat exposure, wherein the crystalline index of the separator is expressed as an intensity ratio $((I_{002}-I_{AM})/I_{002})$ of a crystalline peak intensity $(I_{002}-I_{AM})$ to a total peak intensity $I_{002}$ of a (002) crystal plane in an X-ray diffraction (XRD) spectrum, and the crystalline peak intensity is a difference between the total peak intensity $I_{002}$ of the (002) crystal plane and a peak intensity lane of an amorphous phase.

3. The lithium battery of claim 1, wherein, after the separator impregnated with the electrolyte is exposed to heat at 170° C. for 3 hours under an inert atmosphere, no carbonized areas are visible on a surface of the separator.

4. The lithium battery of claim 1, wherein the electrolyte comprises at least one selected from an ionic metal complex represented by Formula 1 and a lithium salt containing a sulfonyl group (—S(=O)$_2$—):

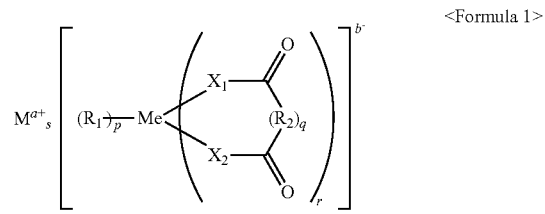

<Formula 1> wherein, in Formula 1, Me is an element selected from transition metals and elements belonging to groups 13 to 15 of the Periodic Table;
M is a metal ion;
a is an integer of 1 to 3, b is an integer of 1 to 3, and s is an integer equal to the value obtained by dividing b by a;
p is 0 to 8, g is 0 or 1, and r is 1 to 4;
X$_1$ and X$_2$ are each independently O, S, or NR$_a$;
R$_1$ and R$_a$ are each independently a halogen, a C$_1$-C$_5$ alkyl group unsubstituted or substituted with one or more halogens, or a C$_1$-C$_5$ aryl group unsubstituted or substituted with one or more halogens; and
R$_2$ is a C$_1$-C$_5$ alkylene group unsubstituted or substituted with a halogen, or a C$_1$-C$_5$ arylene group unsubstituted or substituted with one or more halogens.

5. The lithium battery of claim 4, wherein the ionic metal complex is represented by Formula 2:

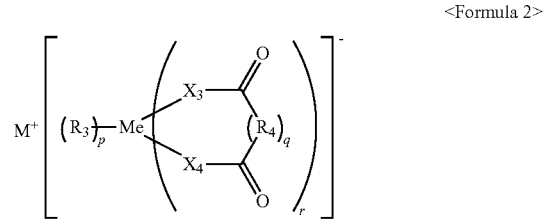

<Formula 2> wherein, in Formula 2, Me is Al, B, or P;
M is a metal ion;
p is 0 to 8, g is 0 or 1, and r is 1 to 4;
X$_3$ and X$_4$ are independently O or S;
R$_3$ is halogen; and
R$_4$ is a C$_1$-C$_5$ alkylene group unsubstituted or substituted with one or more halogens, or a C$_1$-C$_5$ arylene group unsubstituted or substituted with one or more halogens.

6. The lithium battery of claim 4, wherein the ionic metal complex is represented by Formula 3 or 4:

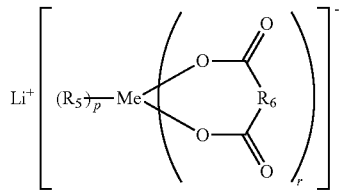
<Formula 3>

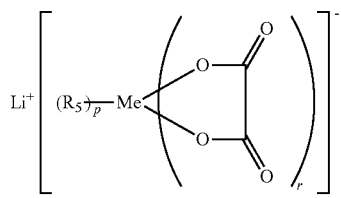
<Formula 4> wherein, in Formulae 3 and 4,

Me is Al, B, or P;

p is 0 to 8, and r is 1 to 4;

$R_5$ is a halogen; and $R_6$ is a $C_1$-$C_5$ alkylene group unsubstituted or substituted with one or more halogens.

7. The lithium battery of claim 4, wherein the ionic metal complex is represented by one of Formulae 5 to 10:

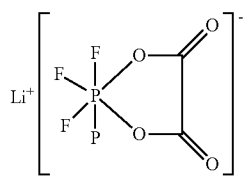
<Formula 5>

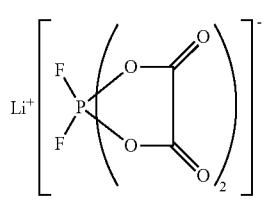
<Formula 6>

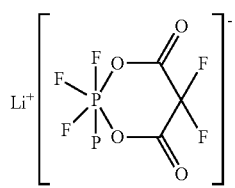
<Formula 7>

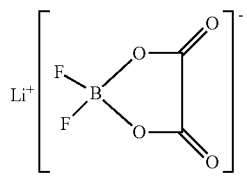
<Formula 8>

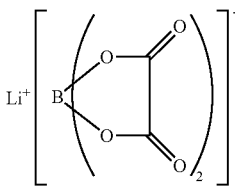
<Formula 9>

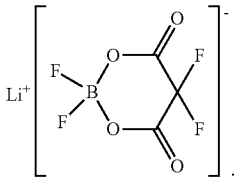
<Formula 10>

8. The lithium battery of claim 4, wherein the lithium salt containing the sulfonyl group is $LiCF_3SO_3$, $LiC_4F_9SO_3$, $Li(CF_3SO_2)_2N$, $Li(C_2F_5SO_2)_2N$, $Li(FSO_2)_2N$, $Li(CF_3SO_3)_2N$, or $LiN(C_xF_{2x+1}SO_2)(C_yF_{2y+1}SO_2)$ wherein x and y are each independently an integer of 3 to 10.

9. The lithium battery of claim 4, wherein a content of at least one selected from the ionic metal complex and the lithium salt containing the sulfonyl group is about 0.01 M to about 5 M based on a total weight of the electrolyte.

10. The lithium battery of claim 1, wherein the electrolyte comprises an organic solvent.

11. The lithium battery of claim 10, wherein the organic solvent includes at least one selected from the group comprising propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene, diethylene glycol, and dimethyl ether.

12. The lithium battery of claim 1, wherein a content of a carboxyl group in the carboxyl group-containing cellulose nanofibers is 0.02 mmol/g to 10 mmol/g.

13. The lithium battery of claim 1, wherein an average diameter of the carboxyl-group-containing cellulose nanofibers is about 45 nm or less.

14. The lithium battery of claim 1, wherein a full width at half maximum (FWHM) in a diameter distribution graph of the carboxyl-group-containing cellulose nanofibers is about 50 nm or less.

15. The lithium battery of claim 1, wherein the carboxyl-group-containing microbial cellulose has an absorption peak near 1572 $cm^{-1}$ in an IR spectrum.

16. The lithium battery of claim 1, wherein the separator further comprises wood-based cellulose nanofibers.

17. The lithium battery of claim 1, wherein the separator has a tensile modulus of about 200 kgf/$cm^2$ to about 1000 kgf/$cm^2$.

18. The lithium battery of claim 1, wherein the separator has a pin-puncture strength of about 30 kgf/$cm^2$ to about 150 kgf/$cm^2$.

19. The lithium battery of claim 1, wherein the separator has a porosity of about 10% to about 90%.

20. The lithium battery of claim 1, wherein the separator has an air permeability of about 50 seconds/100 cc to about 800 seconds/100 cc.

21. The lithium battery of claim 1, wherein the separator has a contact angle with water at 20° C. of about 60° or less.

22. The lithium battery of claim 1, wherein thermal shrinkage of the separator after incubating the porous film at 150° C. for 30 minutes is about 5% or lower.

23. The lithium battery of claim 1, wherein the separator further comprises at least one selected from a cross-linking agent and a binder.

24. The lithium battery of claim 1, wherein the carboxyl group-containing microbial cellulose nanofibers is a fermentation product of a culture solution including a microorganism.

25. The lithium battery of claim 1, wherein the separator comprises:
a single-layered structure comprising a first layer comprising the cellulose nanofibers;
a multi-layered structure comprising: a first layer comprising the cellulose nanofibers; and a second layer disposed on one surface of the first layer and comprising polyolefin;
a multi-layered structure comprising: a first layer comprising the cellulose nanofibers; a second layer disposed on one surface of the first layer and comprising polyolefin; and a thirds layer disposed on another surface of the first layer and comprising a polyolefin;
a multi-layered structure comprising: a first layer comprising the cellulose nanofibers; and a second layer disposed on one surface of the first layer and comprising the cellulose nanofibers, and having a composition different from that of the first layer;
a multi-layered structure comprising: a first layer comprising the cellulose nanofibers; a second layer disposed on one surface of the first layer and comprising the cellulose nanofibers and having a composition different from that of the first layer; and a third layer disposed on another surface of the first layer and comprising the cellulose nanofibers, and having a composition different from that of the first layer;
a multi-layered structure comprising: a first layer comprising the cellulose nanofibers; a second layer disposed on one surface of the first layer and comprising polyolefin; and a third layer disposed on another surface of the first layer and comprising the cellulose nanofibers, and having a composition different from that of the second layer;
a multi-layered structure comprising: a first layer comprising polyolefin; a second layer disposed on one surface of the first layer and comprising the cellulose nanofibers; and a third layer disposed on another surface of the first layer and comprising the cellulose nanofibers; or
multi-layered structure comprising: a first layer comprising polyolefin; a second layer disposed on one surface of the first layer and comprising the cellulose nanofibers; and a third layer disposed on another surface of the first layer and comprising the cellulose nanofibers and having a composition different from that of the second layer.

26. The lithium battery of claim 1, wherein the cathode active material comprises a lithium transition metal oxide having a nickel-containing layered structure, and wherein a content of nickel in the lithium transition metal oxide is 60 mol % or more with respect to a total number of moles of transition metals.

27. The lithium battery of claim 16, wherein the lithium transition metal oxide is represented by Formula 11:

$$Li_aNi_xCo_yM_zO_{2-b}A_b \qquad \text{<Formula 11>}$$

wherein, in Formula 11, $1.0 \leq a \leq 1.2$, $0 \leq b \leq 0.2$, $0.6 \leq x < 1$, $0 < y \leq 0.3$, $0 < z \leq 0.3$, and $x+y+z=1$ are satisfied, and M is at least one selected from manganese (Mn), vanadium (V), magnesium (Mg), gallium (Ga), silicon (Si), tungsten (W), molybdenum (Mo), iron (Fe), chromium (Cr) Zinc (Zn), titanium (Ti), aluminum (Al), and boron (B), and A is F, S, Cl, Br, or a combination thereof.

28. The lithium battery of claim 16, wherein the lithium transition metal oxide is represented by one of Formulae 12 and 13:

$$LiNi_xCo_yMn_zO_2 \qquad \text{<Formula 12>}$$

$$LiNi_xCo_yAl_zO_2 \qquad \text{<Formula 13>}$$

wherein, in Formulae 12 and 13, $0.6 \leq x \leq 0.95$, $0 < y \leq 0.2$, $0 < z \leq 0.1$, and $x+y+z=1$ are satisfied.

29. The lithium battery of claim 1, wherein the anode active material comprises at least one selected from a silicon-based compound, a carbon-based compound, a composite of a silicon-based compound and a carbon-based compound, and a silicon oxide ($SiO_x$, $0<x<2$).

30. The lithium battery of claim 1, wherein, after the lithium battery is charged up to a state of charge of 100% and then exposed to heat at 170° C. for 1 hour, a voltage of the lithium battery after the heat exposure is about 90% or more of a voltage of the lithium battery before the heat exposure.

* * * * *